(12) United States Patent
Sun et al.

(10) Patent No.: US 11,812,742 B2
(45) Date of Patent: Nov. 14, 2023

(54) BIOCIDAL SOLAR CELL

(71) Applicant: The Regents of the University of California, Oakland, CA (US)

(72) Inventors: Gang Sun, Davis, CA (US); Yang Si, Davis, CA (US); Zheng Zhang, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 622 days.

(21) Appl. No.: 16/834,484

(22) Filed: Mar. 30, 2020

(65) Prior Publication Data
US 2020/0221693 A1    Jul. 16, 2020

Related U.S. Application Data

(63) Continuation of application No. PCT/US2018/057781, filed on Oct. 26, 2018.
(Continued)

(51) Int. Cl.
| A01N 25/10 | (2006.01) |
| A01N 25/34 | (2006.01) |
| C09D 5/14 | (2006.01) |
| D01F 1/10 | (2006.01) |
| D06M 13/184 | (2006.01) |
| D06M 16/00 | (2006.01) |

(52) U.S. Cl.
CPC ............ *A01N 25/10* (2013.01); *A01N 25/34* (2013.01); *C09D 5/14* (2013.01); *D01F 1/103* (2013.01); *D06M 13/1845* (2013.01); *D06M 16/00* (2013.01)

(58) Field of Classification Search
None
See application file for complete search history.

(56) References Cited

U.S. PATENT DOCUMENTS

| 6,420,455 B1 | 7/2002 | Landgrebe et al. |
| 2009/0197084 A1 | 8/2009 | Sun et al. |
| (Continued) |

OTHER PUBLICATIONS

Sun, G. & Hong, K.H., Photo-induced antimicrobial and decontaminating agents: recent progresses in polymer and textile applications, Text. Res. J., 83 (2012) pp. 532-542. (Year: 2012).*

(Continued)

*Primary Examiner* — Dominic Lazaro
(74) *Attorney, Agent, or Firm* — Kilpatrick Townsend and Stockton LLP

(57) ABSTRACT

This invention provides antibacterial and antiviral compositions and methods. The compositions possess prolonged and powerful antibacterial/antiviral functions under light exposure and even under completely dark conditions, while daylight exposures could recharge the functions repeatedly. In some embodiments, compositions of the invention can be employed in personal protective equipment (PPE) such as face masks, biologically self-cleaning air and water filters, medical devices, and products. The biocidal PPE can prevent transmission of infectious diseases such as Ebola and respiratory viruses. In some embodiments, compositions of the invention can be employed in food protectant materials to provide antimicrobial and antiviral bio-protection during food transportation and storage.

19 Claims, 25 Drawing Sheets

BA-RNM

BD-RNM

CA-RNM

BDCA-RNM

Related U.S. Application Data

(60) Provisional application No. 62/577,694, filed on Oct. 26, 2017.

(56) References Cited

U.S. PATENT DOCUMENTS

| | | | |
|---|---|---|---|
| 2010/0233458 A1* | 9/2010 | Sun | D01F 8/14 428/401 |
| 2017/0021021 A1 | 1/2017 | Karnaev et al. | |

OTHER PUBLICATIONS

Hong, K.H. & Sun, G., Photoinduced Antimicrobial Polymer Blends with Benzophenone as a Functional Additive, J. Appl. Polym. Sci., 112 (2009), pp. 2019-2026. (Year: 2009).*

International Search Report and Written Opinion in PCT/US2018/057781 dated Jan. 15, 2019; 10 pages.

Hong, K.H. et al.; "Photoinduced antimicrobial polymer blends with benzophenone as a functional additive"; *Journal of Applied Polymer Science*; vol. 112; Feb. 12, 2009; 1 page.

Sun, G. et al.; "Photo-induced antimicrobial and decontaminating agents: recent progresses in polymer and textile applications"; *Textile Research Journal*; vol. 83, No. 5; Nov. 27, 2012; pp. 532-542.

\* cited by examiner

BIOCIDAL SOLAR CELL

CROSS-REFERENCES TO RELATED APPLICATIONS

This application is a continuation of International Application No. PCT/US2018/057781 (filed Oct. 26, 2018), which claims the priority of U.S. Provisional Patent Application No. 62/577,694 (filed Oct. 26, 2017), the disclosures of which are herein incorporated by reference in their entireties for all purposes.

STATEMENT AS TO RIGHTS TO INVENTIONS MADE UNDER FEDERALLY SPONSORED RESEARCH AND DEVELOPMENT

This invention was made with government support under grant number 2015-68003-23411 awarded by the United States Department of Agriculture. The government has certain rights in the invention.

BACKGROUND

Public health outbreaks driven by emerging infectious diseases (EIDs) constitute the forefront of global safety concerns (Medley and Vassall (2017) Science 357:156 and Halliday et al. (2017) Science 357:146). EID outbreaks such as those of severe acute respiratory syndrome, avian influenza, and Ebola virus disease (EVD) have shaped the course of human history and caused incalculable misery and deaths (Woolhouse (2008) Nature 451:898; Morens (2010) Nature 463:122; and Halloran and Longini (2014) Science 345:1292). This issue was highlighted by the 2014 EVD epidemic crisis in West Africa, which included a total of 28,646 confirmed cases with 11,323 deaths, and which was an explicit example of the unpreparedness of the public health system (Holmes (2016) Nature 538:193; Ogoina et al. (2016) PloS ONE 11; and Rivers (2014) Nature 515:493). Significantly, the risk of acquisition of an EID during the care of a patient is particularly high for healthcare workers (HCWs). While the HCWs did their best to control these recent EVD outbreaks, 852 HCWs were diagnosed with Ebola, and 492 died, as the infection incidence among HCWs became 100 times higher than that of the general population (Petti et al. (2016) Biomed. Res. Int. 2016 and Poliquin et al. (2016) 214:S145).

To prevent the transmission of EIDs in a workplace, HCWs are advised to wear personal protective equipment (PPE), including face masks, bio-protective suits, and medical gloves according to standard infection prevention and control protocols (Gralton and McLaws (2010) Crit. Care Med. 38:657; Gralton and McLaws (2011) Crit. Care Med. 39:170; and McMahon et al (2016) 31:1232). While this PPE can significantly minimize the spread of pathogens, the associated risk of infection cannot be entirely eliminated (Honda and Iwata (2016) Curr. Opin. Infect. Dis. 29:400 and Liu et al. (2016) PLoS ONE 11). EID pathogens can be effectively captured and intercepted by the relevant protective equipment and materials; however, the pathogens can be transferred by cross-contamination, which can lead to increased risk of infection (Haas et al. (2017) Water Environ. Res. 89:357; Bibby et al. (2015) Environ. Sci. Technol. Lett. 2:245; and Bibby et al. (2015) Environ. Sci. Technol. Lett. 2:2).

Alternatively, protecting technologies can incorporate biocidal agents into PPE materials as another strategy for providing bio-protection against EID pathogens by achieving pathogen inactivation on contact. Various biocides—such as triclosan, nisaplin, essential oils, peptides, chitosan, silver nanoparticles, and halamine structures—have been incorporated into materials for bio-protective applications (Makarovsky et al. (2011) Adv. Funct. Mater. 21:4295; Liu et al. (2009) J. Agric. Food Chem. 57:8392; Sun et al. (2014) J. Agric. Food Chem. 62:8914; Marchesan et al. (2013) Biomaterials 34:3678; Cao and Sun (2008) J. Niomed. Mater. Res. A 85A:99; and Son et al. (2004) Macromol. Rapid Comm. 25:1632). However, the initial biocidal efficacy of these materials usually suffers from a significant decline due to the irreversible consumption of the biocidal compounds.

As a result, desirable properties of antimicrobial bio-protective materials include not only biocidal activity, defined as a capacity for the killing of microbial pathogens, but also the renewability of biocidal functions, affecting the durability and reusability of the materials in long-term deployment (Fan et al. (2013) J. Mater. Chem. B 1:2222 and Branch-Elliman (2015) Infect. Control Hosp. Epidemiol. 36:336). As an example, rechargeable biocidal halamine materials have been developed and extensively investigated in recent years, and their functions can meet the basic requirements of bio-protection (Qian et al. (2006) AATCC Rev. 6:55 and Si et al. (2017) Macromol. Biosci. 17). However, the use of a chlorine bleach solution as a recharging agent limits the applications for which these materials are suitable.

In contrast, photo-induced antimicrobial materials can possess high biocidal efficiency, ease of activity recharging, broad-spectrum biocides, long-term stability, high durability, and low toxicity with little environmental concern (Velema et al. (2013) Nat. Chem. 5:924; Dosseli et al. (2013) 56:1052; Mizukami et al. (2010) J. Am. Chem. Soc. 132:9524; and Sun and Hong (2013) Text. Res. J. 83:532). Despite their potential, however, photo-antimicrobial materials can suffer from drawbacks associated with their solely photo-driven biocidal character, with initial biocidal functions rapidly decaying or quenching in dim light or dark conditions (Hong and Sun (2010) Polym. Eng. Sci. 50:1780; Lim et al. (2012) Polym. Int. 61:1519; and Du et al. (2015) Adv. Funct. Mater. 25:5016). Moreover, these products are typically driven by high-energy ultraviolet (UV) light rather than by ambient daylight (Sun and Hong (2013) and Du et al. (2015)). This requirement for specialized irradiation systems which are often energetically and operationally intensive significantly limits the usability of the materials for bio-protection.

In view of these and other issues, the need exists for effective, easy-to-use, field-deployable, and durable PPE materials to provide antimicrobial bio-protection from infection, in particular for use in outdoor emergency medical services. Additionally, there is a need for daylight-driven and rechargeable antimicrobial materials capable of functioning in both light and dark conditions without compromising the interception performance against tiny pathogenic particles. In some embodiments, the present invention satisfies these and other needs.

A further area of application of photo-antimicrobial materials is for food preservation, as bacterial or viral contamination of food during its production, transportation, and storage frequently results in human sickness. Examples of human illnesses caused by food-borne contaminants include salmonellosis, listeriosis, and hepatitis A. Further, the risk of microbial contamination reduces shelf life, as many precautions taken to avoid bacteria-induced spoilage or to prevent microbial contamination (e.g., expiration dates) result in greater food waste.

In view of these and other issues, a need exists for effective, edible food protectant materials to provide antimicrobial and antiviral bio-protection from contamination during food transportation and storage. As food is frequently stored under either daylight or dark conditions during transport and sale, daylight-driven and rechargeable antimicrobial materials capable of functioning in both light and dark conditions would be advantageous. In some embodiments, the present invention satisfies these and other needs.

FIELD OF THE INVENTION

In certain aspects, the field of the invention is anti-bacterial and anti-viral materials and methods useful for improving personal protective equipment. In certain aspects, the field of the invention is anti-bacterial and anti-viral materials and methods useful for improving food safety, extending food shelf life, and reducing food waste.

BRIEF SUMMARY OF THE INVENTION

Provided herein are compositions and methods involving daylight-driven antibacterial and antiviral rechargeable micro- or nanofibrous membranes (RNMs) by incorporating photosensitizers that can effectively and efficiently produce reactive oxygen species (ROS). In some preferred embodiments, daylight-active agents and RNMs can store photo-induced biocidal activity under conditions of light irradiation and then readily release ROS providing biocidal functions even under dim or dark conditions.

In some embodiments, the present inventions sets forth a photobiocidal polymer including:
a foundation polymer; and
a photosensitizer or photosensitizer moiety; wherein the photosensitizer or photosensitizer moiety is selected from a benzophenone, a quinone, and a polyphenol.

In some embodiments, the photosensitizer is mixed with the foundation polymer. In some embodiments, the photosensitizer moiety is linked to the foundation polymer.

In some embodiments, the photosensitizer or photosensitizer moiety is selected from

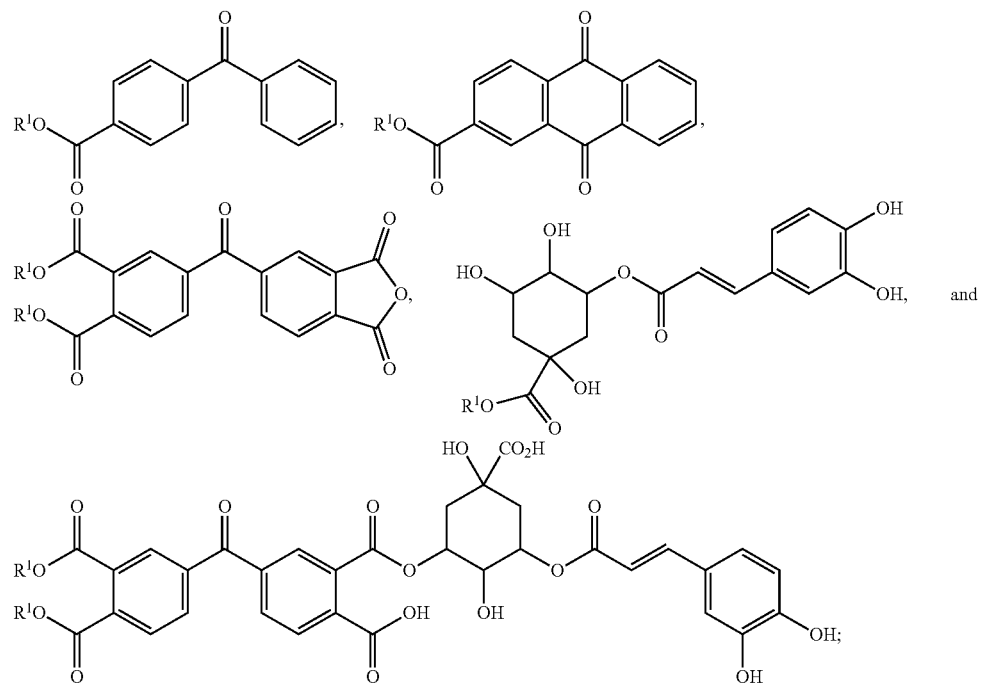

and
wherein each $R^1$ is independently selected from hydrogen, alkyl (e.g., $C_{1-12}$ alkyl), and a bond to the foundation polymer.

In some embodiments, the photosensitizer or photosensitizer moiety is selected from vitamin K3, vitamin B2, petunidin, epigallocatechin, epigallocatechin gallate, shikonin, curcurmin, wherein each $R^1$ is independently selected from hydrogen, alkyl (e.g., $C_{1-12}$ alkyl), and a bond to the foundation polymer.

In some embodiments, the invention sets forth a photobiocidal fiber including a photobiocidal polymer as otherwise disclosed herein. In some embodiments, the photobiocidal fiber is a nanofiber. In some embodiments, the photobiocidal fiber is a microfiber.

In some embodiments, the invention sets forth a porous membrane including a photobiocidal fiber as otherwise disclosed herein. In some embodiments, the porous membrane has an average fiber diameter ranging from about 100 nm to 500 nm (e.g., about 200 nm to 250 nm). In some embodiments, the porous membrane has a thickness ranging from about 1 µm to 500 µm.

In some embodiments, the porous membrane includes poly(vinyl alcohol-co-ethylene). In some embodiments, the porous membrane includes a biopolymer (e.g., a polysaccharide, such as cellulose, alginate, or chitosan; a protein, such as gelatin or collagen).

In some embodiments, the invention sets forth a biocidal material including a porous membrane as otherwise disclosed herein.

In some embodiments, the incorporation of RNMs as a biocidal-surface protective layer on protective equipment can provide robust bio-protection against both bacterial and viral pathogens.

In some embodiments, the invention sets forth a wearable article including
  a personal protective equipment, and
  a biocidal material as otherwise disclosed herein;
    wherein the biocidal material is attached to a surface of the personal protective equipment. In some embodiments, the surface is an outer or intermediate surface of the personal protective equipment.

In some embodiments, the personal protective equipment is a face mask or respirator. In some embodiments, the personal protective equipment is a bio-protective suit or laboratory coat. In some embodiments, the personal protective equipment is a glove.

In some embodiments, the incorporation of non-toxic or edible RNMs as a biocidal packaging material or a protective coating on food can provide bio-protection against both bacterial and viral pathogens, leading to extended shelf life and less food waste. In some embodiments, the invention sets forth n article for food packaging comprising a biocidal material as otherwise disclosed herein. In some embodiments, the article is a film or layer of coating material.

These and other objects, aspects, and embodiments will become more apparent when read with the following detailed description and drawings.

BRIEF DESCRIPTION OF THE DRAWINGS

FIG. 37 is a graph of QF values of selected fibrous filter materials with various basis weights.

FIG. 38 is a photograph of a bacterial aerosols generation apparatus used in an interception test by N100 mask.

DETAILED DESCRIPTION OF THE INVENTION

I. Definitions

Figure 1:
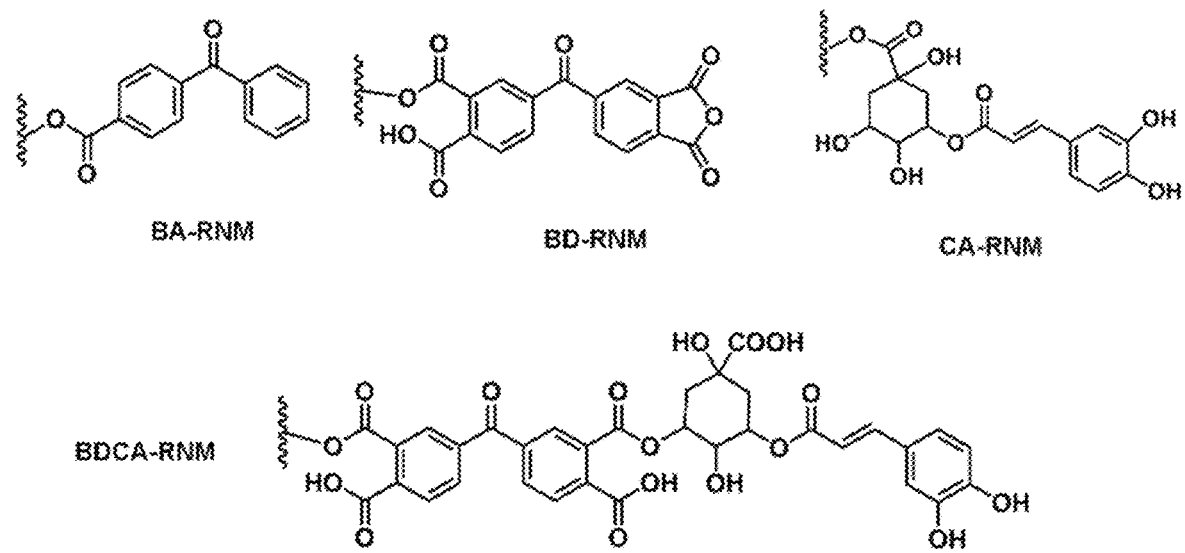
FIG. 1 presents the chemical structures of photobiocidal sensitizer groups in four classes of rechargeable nanofibrous membranes (RNMs)—BA-RNM, BD-RNM, CA-RNM, and BDCA-RNM.

The terms "a," "an," or "the" as used herein not only includes aspects with one member, but also includes aspects with more than one member.

The term "about" as used herein to modify a numerical value indicates a defined range around that value. If "X" were the value, "about X" would generally indicate a value from 0.95X to 1.05X. Any reference to "about X" specifically indicates at least the values X, 0.95X, 0.96X, 0.97X, 0.98X, 0.99X, 1.01X, 1.02X, 1.03X, 1.04X, and 1.05X. Thus, "about X" is intended to teach and provide written description support for a claim limitation of, e.g., "0.98X."

When "about" is applied to the beginning of a numerical range, it applies to both ends of the range. Thus, "from about 1 to 500" is equivalent to "from about 1 to about 500." When "about" is applied to the first value of a set of values, it applies to all values in that set. Thus, "about 7, 9, or 11%" is equivalent to "about 7%, about 9%, or about 11%."

In compositions comprising an "additional" or "second" component, the second component as used herein is chemically different from the other components or the first component. A "third" component is different from the other, first, and second components, and further enumerated or "additional" components are similarly different.

The terms "comprise," "comprises," and "comprising" as used herein should in general be construed as not closed—that is, as possibly including additional components that are not expressly mentioned. For example, an embodiment of "a composition comprising A" would include A, but might also include B, B and C, or still other components in addition to A.

The term "foundation polymer" as used herein refers to a polymeric material to which a photosensitizing moiety may be attached or with which a photosensitizer may be mixed. Examples of foundation polymers include polyethylene, poly(vinyl alcohol-co-ethylene), In some embodiments, a foundation polymer is edible or ingestible by a human without adverse effects. Examples of foundation polymers that may be ingested by a human include alginate, chitosan, cellulose, poly(lactic acid), poly(glycolic acid), collagen, gelatin, and the like, In some embodiments, a foundation polymer may include a copolymer that is modified to include a functional group providing a point of attachment for a photosensitizer moiety. An example would be the inclusion of a small amount of lactic acid monomer in a poly(glycolic acid) to provide a foundation polymer with alcohol groups on the polymer backbone.

The term "or" as used herein should in general be construed non-exclusively. For example, an embodiment of "a composition comprising A or B" would typically present an aspect with a composition including both A and B. "Or" should, however, be construed to exclude those aspects presented that cannot be combined without contradiction (e.g., a average thickness that is between 100 and 200 or between 400 and 500).

The term "microfiber" as used herein refers to a fiber with a thickness of between about 1 micrometer ($\mu$m) to 1000 $\mu$m (e.g., about 1 to 5; about 2 to 10; about 3 to 15; about 5 to 25; about 10 to 50; about 25 to 100; about 50 to 250; about 100 to 500). Typically, a microfiber is one of a group of polymeric fibers that have an average thickness of between about 1 $\mu$m to 1000 $\mu$m.

The term "nanofiber" as used herein refers to a fiber with a thickness of between about 1 nm to 1000 nm (e.g., about 1 to 5; about 2 to 10; about 3 to 15; about 5 to 25; about 10 to 100; about 15 to 150; about 25 to 200 or 250; about 50 to 400 or 500; about 75 to 750). Typically, a nanofiber is one of a group of polymeric fibers that have an average thickness of between about 1 nm to 1000 nm.

The term "photosensitizer" as used herein refers to a chemical compound that can absorb light and produce reactive oxygen species, either directly (e.g., by direct formation of hydroxy or perooxy radical species) or indirectly (e.g., by transferring the energy to another photosensitizer molecule of the same or a different structure, which then produces reactive oxygen species).

The term "photosensitizer moiety" or "photosensitizer group" as used herein refers to a photosensitizer has a point of attachment (e.g., a covalent bond or bonds) to another molecule, such as a polymer.

In some embodiments, the point of attachment is an ester or an amide group that is derived from part of the photosensitizer (e.g., an acid group) and the polymer (e.g., an alcohol or amino group on the polymer, either directly or through a spacer group, such as a polyethylene or other dihydroxy group, that is not part of the repeating unit). In some embodiments, the point of attachment is an carbonate, urea, or urethane group that is derived from part of the photosensitizer (e.g., an alcohol or amino group) and the polymer (e.g., an alcohol or amino group on the polymer) that are coupled with a phosgene equivalent, such as carbonyl diimidazole (CDI) or triphosgene.

The term "reactive oxygen species" or "ROS" as used herein refers to chemically reactive, oxygen-containing free radical species or their reactive products. Examples include peroxy, superoxy, and hydroxyl radicals as well as photochemically produced hydrogen peroxide. In some embodiments, ROS are produced by transfer of energy from a photosensitizer.

The term "w/w" or "wt/wt" means a percentage expressed in terms of the weight of the ingredient or agent over the total weight of the composition multiplied by 100.

II. Embodiments

Provided herein are materials and methods involving daylight-driven antibacterial and antiviral rechargeable micro- or nanofibrous membranes (RNMs) by incorporating daylight-active chemicals that can effectively and efficiently produce reactive oxygen species (ROS). The daylight-active chemicals can be photosensitizers with additionally incorporated structures that can enhance their photo-activities. By using this design, the inventors have surprisingly discovered that daylight-active agents and RNMs can store photo-induced biocidal activity under conditions of light irradiation, and readily release ROS providing biocidal functions under dim or dark conditions. The RNMs can exhibit integrated properties of robust daylight absorbance, fast ROS production, ease of activity storage, long-term durability, and high biocidal efficacy. The incorporation of RNMs as a biocidal surface protective layer on protective equipment can provide robust bio-protection against both bacterial and viral pathogens. The incorporation of edible RNMs as a biocidal surface protective layer on food can provide bio-protection against both bacterial and viral pathogens, leading to extended shelf life and less food waste.

In some embodiments, RNMs were prepared and selected based on three criteria: (1) effective interception of pathogen particles via the porous nanostructure of the membranes, (2) incorporation of daylight-active biocidal agents under daylight irradiation, and (3) storage of biocidal activity and ready release of the activity under dark condition. The first requirement was satisfied by using micro- or nanotextured materials such as ultrafine electrospun nanofibers as templates for achieving a breathable interception barrier. To satisfy the other two criteria—together providing for the formation of rechargeable biocidal functions—a molecular design was used that was based on benzophenones and polyphenols. Without being bound by a particular theory, it is believed that the biocidal activity of these compounds originates from ROS generated when the compounds were exposed to light irradiation in the presence of oxygen.

In some embodiments, the present inventions sets forth a photobiocidal polymer including:
  a foundation polymer; and
  a photosensitizer or photosensitizer moiety; wherein the photosensitizer or photosensitizer moiety is selected from a benzophenone, a quinone, and a polyphenol.

In some embodiments, the photosensitizer or photosensitizer moiety is selected from a benzophenone. Benzophenone and its derivatives incorporate the photoactive group:

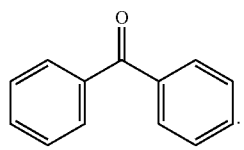 [SMILES: O=C(c1ccccc1)c1ccccc1]

In some embodiments, the aryl rings can have one or more substituents selected from halo (i.e., F, Cl, Br, and I), $C_{1-12}$ alkyl, hydroxyl, $C_{1-12}$ ether, amino, $C_{1-12}$ amino, carboxylic acid, $C_{1-12}$ ester, and $C_{1-12}$ amide. In some embodiments, an acid anhydride ring can be fused with one or more sides of the aryl rings, as in the photosensitizer or photosensitizer moiety:

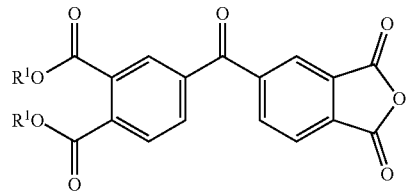

wherein each $R^1$ is independently selected from hydrogen, alkyl (e.g., $C_{1-12}$ alkyl), and a bond to the foundation polymer.

In some embodiments, the photosensitizer or photosensitizer moiety is selected from a quinone, such as an anthraquinone. Anthraquinone and its derivatives incorporate the photoactive group:

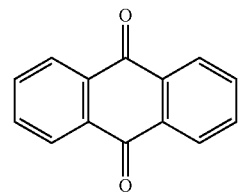 [SMILES: O=C1c2ccccc2C(=O)c2ccccc21]

In some embodiments, the aryl rings can have one or more substituents selected from halo (i.e., F, Cl, Br, and I), $C_{1-12}$ alkyl, hydroxyl, $C_{1-12}$ ether, amino, $C_{1-12}$ amino, carboxylic acid, $C_{1-12}$ ester, and $C_{1-12}$ amide. In some embodiments, an acid anhydride ring can be fused with one or more sides.

In some embodiments, the photosensitizer or photosensitizer moiety is selected from a polyphenol. Polyphenols incorporate at least one phenyl ring with multiple hydroxyl or ether groups, such as the photosensitizer or photosensitizer moiety:

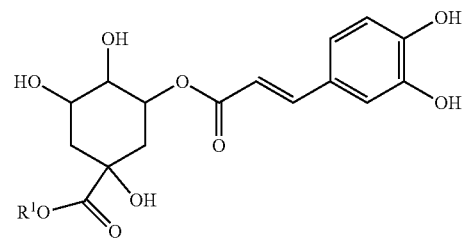

wherein each $R^1$ is independently selected from hydrogen, alkyl (e.g., $C_{1-12}$ alkyl), and a bond to the foundation polymer.

In some embodiments, the photosensitizer is mixed with the foundation polymer. In some embodiments, the photosensitizer is from about 1 to about 25% w/w of the foundation polymer (e.g., about 1 to 15%; about 5 to 15%; about 3 to about 15%; about 1, 2, 3, 4, 5, 6, 7, 8, 9, 10, 11, 12, 13, 14, 15, 16, 17, 18, 19, 20, 21, 22, 23, 24, or 25%).

In some embodiments, the photosensitizer moiety is linked to the foundation polymer. In some embodiments, the photosensitizer moiety is from about 1 to about 25% w/w of the foundation polymer (e.g., about 1 to 15%; about 5 to 15%; about 3 to about 15%; about 1, 2, 3, 4, 5, 6, 7, 8, 9, 10, 11, 12, 13, 14, 15, 16, 17, 18, 19, 20, 21, 22, 23, 24, or 25%).

In some embodiments, the photosensitizer moiety is linked directly to the foundation polymer. In some embodiments, the photosensitizer moiety is linked though a spacer group (e.g., a $C_{2-30}$ alkyl diether, a poly(alkylene glycol), a $C_{2-30}$ alkyl diamide, or a $C_{2-30}$ alkyl diester).

In some embodiments, the photosensitizer or photosensitizer moiety is selected from the group:

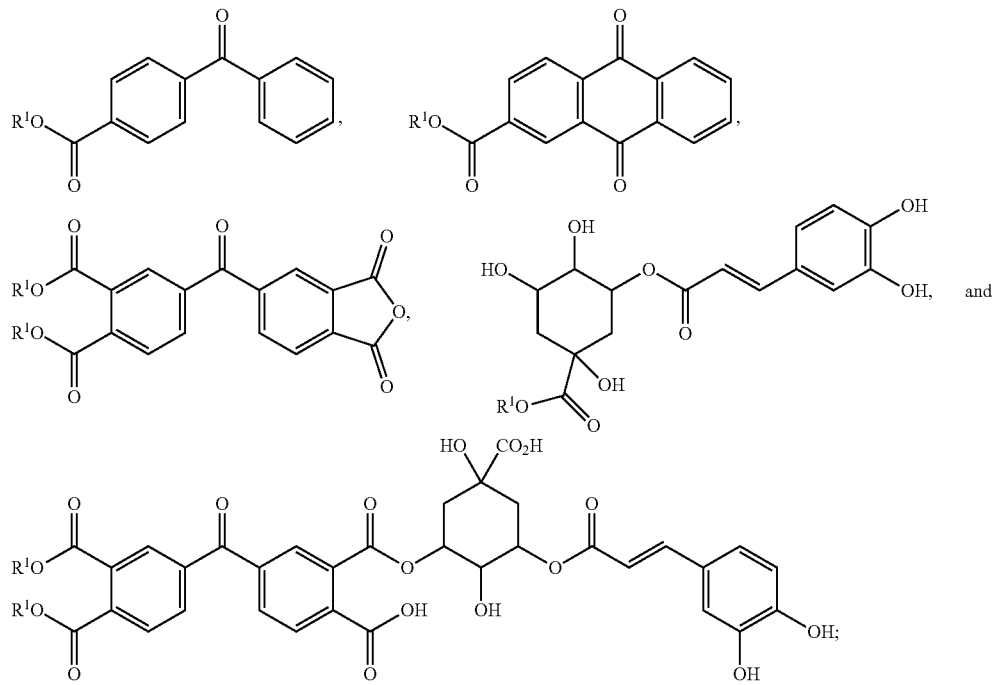

wherein each $R^1$ is independently selected from hydrogen, alkyl (e.g., $C_{1-12}$ alkyl), and a bond to the foundation polymer. In some embodiments, the photosensitizer or photosensitizer moiety is selected from any one, any two, any three, or any four of the generic structures shown above.

In some embodiments, the photosensitizer or photosensitizer moiety is selected from vitamin K3, vitamin B2, petunidin, epigallocatechin, epigallocatechin gallate, shikonin, curcurmin,

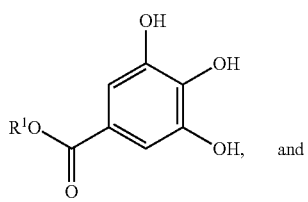

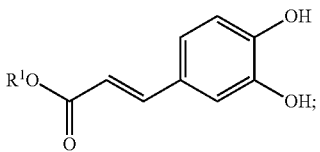

wherein each $R^1$ is independently selected from hydrogen, alkyl (e.g., $C_{1-12}$ alkyl), and a bond to the foundation polymer. In some embodiments, the photosensitizer or photosensitizer moiety is vitamin K3. In some embodiments, the photosensitizer or photosensitizer moiety is vitamin B2. In some embodiments, the photosensitizer or photosensitizer moiety is petunidin. In some embodiments, the photosensitizer or photosensitizer moiety is epigallocatechin. In some embodiments, the photosensitizer or photosensitizer moiety is epigallocatechin gallate. In some embodiments, the photosensitizer or photosensitizer moiety is shikonin. In some embodiments, the photosensitizer or photosensitizer moiety is curcurmin.

In some embodiments, the photosensitizer or photosensitizer moiety is

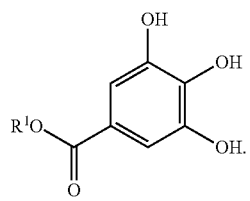

In some embodiments, the photosensitizer or photosensitizer moiety is

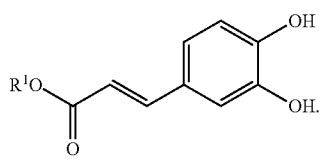

In some embodiments, the invention sets forth a photobiocidal fiber including a photobiocidal polymer as otherwise disclosed herein. In some embodiments, the photobiocidal fiber is a nanofiber. In some embodiments, the photobiocidal fiber is a microfiber.

In some embodiments, the photobiocidal fiber is a microfiber. In some embodiments, the photobiocidal fiber has a thickness (or an average thickness) of about 1 to 5 μm (e.g., about 1, 2, 3, 4, or 5). In some embodiments, the photobiocidal fiber has a thickness (or an average thickness) of about 2 to 10 μm (e.g., about 2, 3, 4, 5, 6, 7, 8, 9, or 10). In some embodiments, the photobiocidal fiber has a thickness (or an average thickness) of about 3 to 15 μm (e.g., about 3, 4, 5, 6, 7, 8, 9, 10, 11, 12, 13, 14, or 15; about 5 to 25; about 10 to 50; about 255 to 100).

In some embodiments, the invention sets forth a porous membrane including a photobiocidal fiber as otherwise disclosed herein.

In some embodiments, the porous membrane has an average fiber diameter ranging from about 100 nm to 500 nm (e.g., about 200 nm to 250 nm; about 100 to 300; about 150 to 350; about 100, 110, 120, 130, 140, 150, 160, 170, 180, 190, 200, 205, 210, 215, 220, 225, 230, 235, 240, 245, 250, 260, 270, 280, 290, 300, 310, 320, 330, 340, 350, 360, 370, 380, 390, 400, 410, 420, 430, 440, 450, 460, 470, 480, 490, or 500).

In some embodiments, the porous membrane has a thickness ranging from about 1 m to 500 μm (e.g., about 1 to 10, about 10 to 100, about 100 to 250, about 200 nm to 500, about 100 to 300; about 150 to 350; about 1, 2, 3, 4, 5, 6, 7, 8, 9, 10, 15, 20, 25, 30, 35, 40, 45, 50, 55, 60, 65, 70, 75, 80, 85, 90, 95, 100, 110, 120, 130, 140, 150, 160, 170, 180, 190, 200, 205, 210, 215, 220, 225, 230, 235, 240, 245, 250, 260, 270, 280, 290, 300, 310, 320, 330, 340, 350, 360, 370, 380, 390, 400, 410, 420, 430, 440, 450, 460, 470, 480, 490, or 500).

In some embodiments, the porous membrane includes poly(vinyl alcohol-co-ethylene). In some embodiments, the porous membrane includes a biopolymer (e.g., a polysaccharide, such as cellulose, alginate, or chitosan; a protein, such as gelatin or collagen).

In some embodiments, the invention sets forth a biocidal material including a porous membrane as otherwise disclosed herein.

In some embodiments, the incorporation of RNMs as a biocidal-surface protective layer on protective equipment can provide robust bio-protection against both bacterial and viral pathogens.

In some embodiments, the invention sets forth a wearable article including a personal protective equipment, and a biocidal material as otherwise disclosed herein;

wherein the biocidal material is attached to a surface of the personal protective equipment. In some embodiments, the surface is an outer or intermediate surface of the personal protective equipment.

In some embodiments, the personal protective equipment is a face mask or respirator. In some embodiments, the personal protective equipment is a bio-protective suit or laboratory coat. In some embodiments, the personal protective equipment is a glove.

In some embodiments, the incorporation of non-toxic or edible RNMs as a biocidal packaging material or a protective coating on food can provide bio-protection against both bacterial and viral pathogens, leading to extended shelf life and less food waste. In some embodiments, the invention sets forth an article for food packaging comprising a biocidal material as otherwise disclosed herein. In some embodiments, the article is a film or layer of coating material.

In some embodiments, the invention sets forth a product substantially as described herein.

In some embodiments, the invention sets forth a biocidal material comprising:

a nanofibrous membrane; and a photoactive chemical selected from the group consisting of 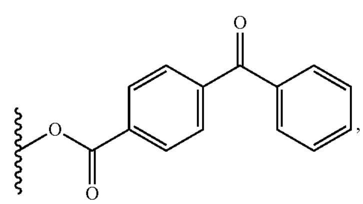 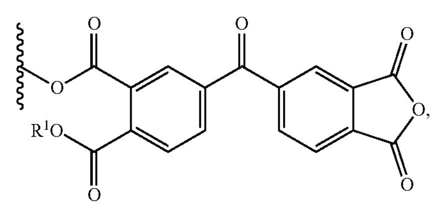 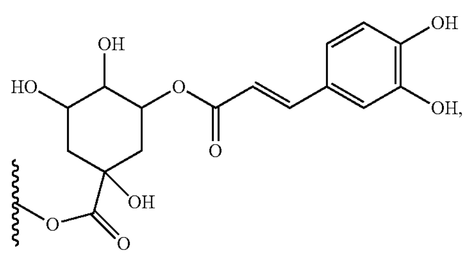 and In some embodiments, the photoactive chemical is bonded to the nanofibrous membrane.

In some embodiments, the invention sets forth the biocidal material as discussed herein, wherein the photoactive chemical is

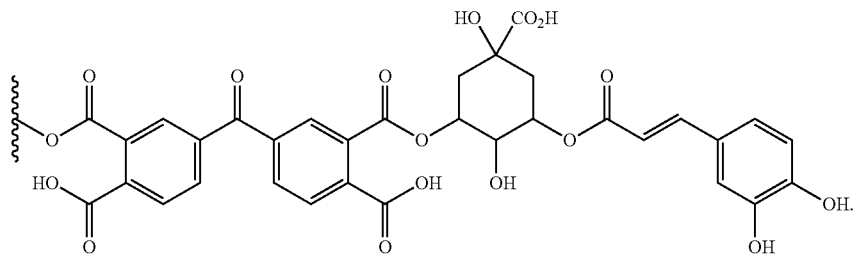 [SMILES: *OC(=O)c1cc(C(=O)c2ccc(C(=O)O)c(C(=O)OC3CC(O)(C(=O)O)CC(OC(=O)/C=C/c4ccc(O)c(O)c4)C3O)c2)ccc1C(=O)O]

In some embodiments, the invention sets forth the biocidal material as discussed herein, wherein the photoactive chemical is

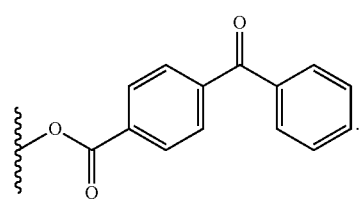 [SMILES: *OC(=O)c1ccc(C(=O)c2ccccc2)cc1]

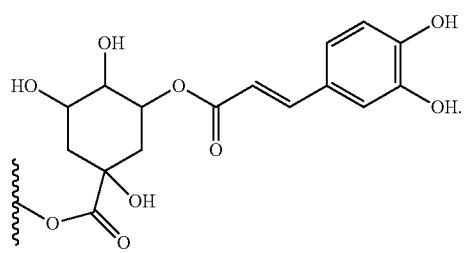

In some embodiments, the invention sets forth the biocidal material as discussed herein, wherein the photoactive chemical is

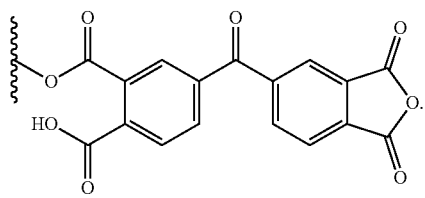 [SMILES: *OC(=O)c1cc(C(=O)c2ccc3c(c2)C(=O)OC3=O)ccc1C(=O)O]

In some embodiments, the invention sets forth the biocidal material as discussed herein, wherein the photoactive chemical is In some embodiments, the invention sets forth the biocidal material as discussed herein, wherein the nanofibrous membrane comprises poly(vinyl alcohol-co-ethylene).

In some embodiments, the invention sets forth the biocidal material as discussed herein, wherein the nanofibrous membrane has an average fiber diameter ranging from 200 nm to 250 nm.

In some embodiments, the invention sets forth the biocidal material as discussed herein, wherein the nanofibrous membrane has a thickness ranging from 1 μm to 500 μm.

In some embodiments, the invention sets forth a compound having the formula:

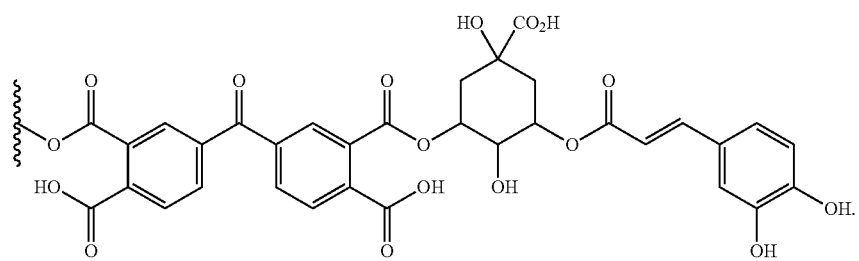 [SMILES: *OC(=O)c1cc(C(=O)c2ccc(C(=O)O)c(C(=O)OC3CC(O)(C(=O)O)CC(OC(=O)/C=C/c4ccc(O)c(O)c4)C3O)c2)ccc1C(=O)O]

III. Examples

Example 1: Preparation of Nanofiber Networks and Membranes

Figure 2:
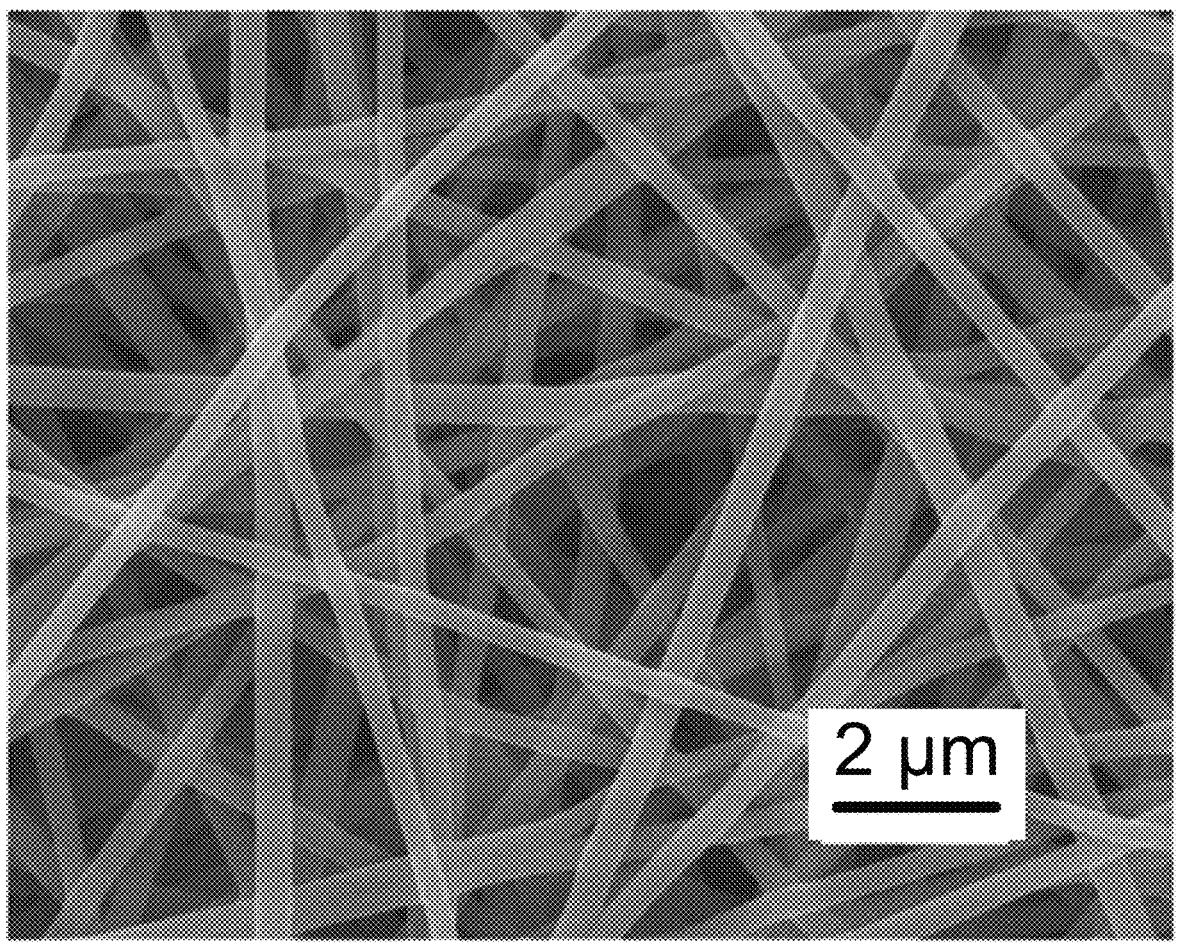
FIG. 2 is a scanning electron microscopy (SEM) image of spun PVA-co-PE nanofibers.
Figure 3:
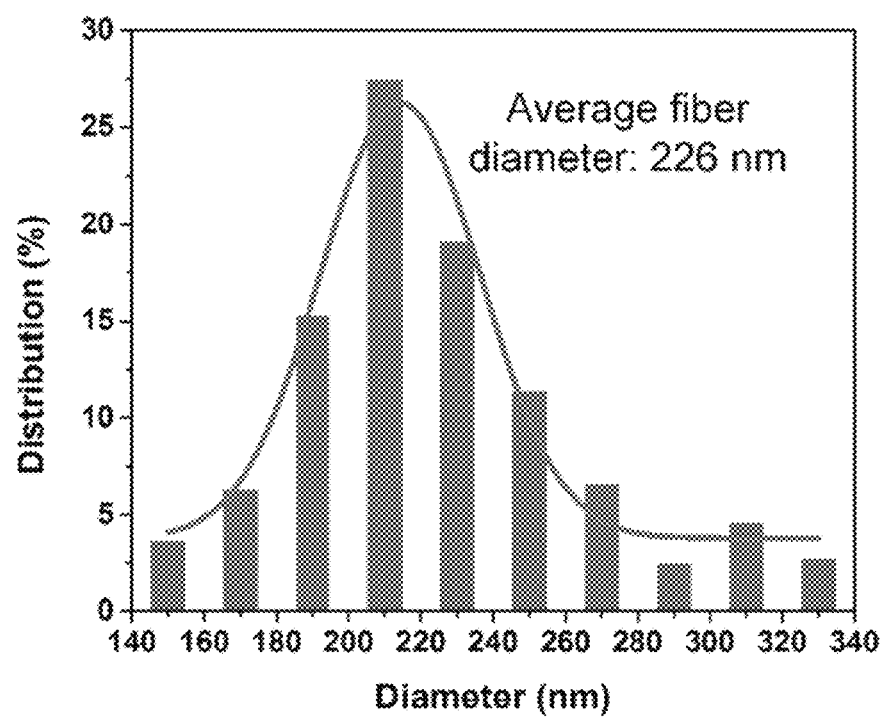
FIG. 3 is a graph of the fiber diameter distribution in the nanofibers of FIG. 2.
Figure 4:
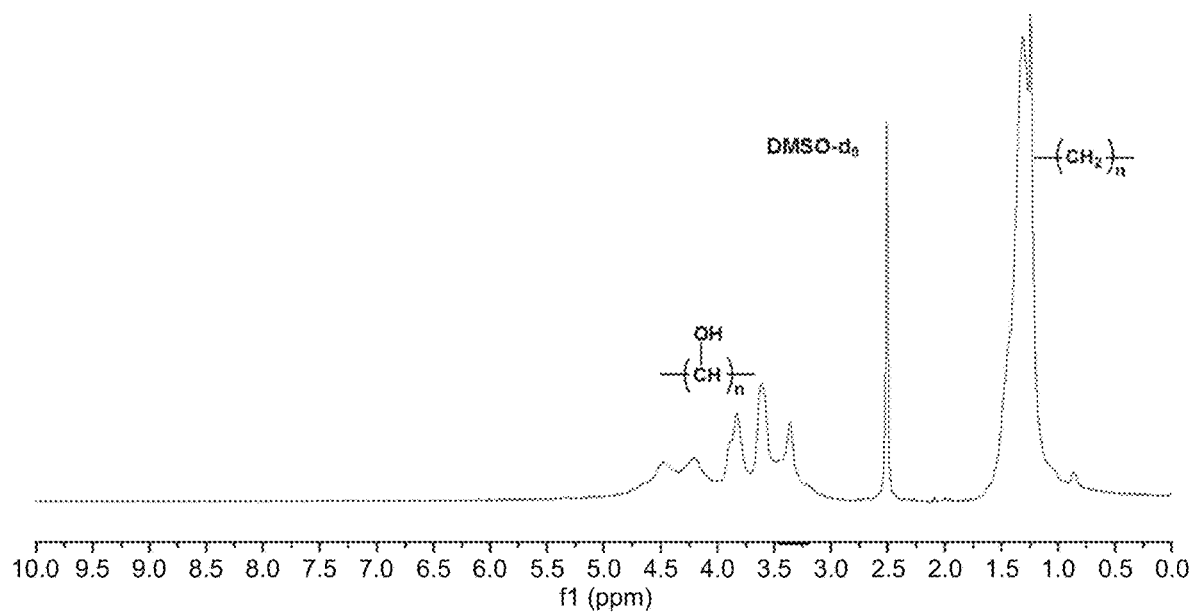
FIG. 4 is a $^1$H-NMR spectrum of the nanofibers of FIG. 1.
Figure 5:
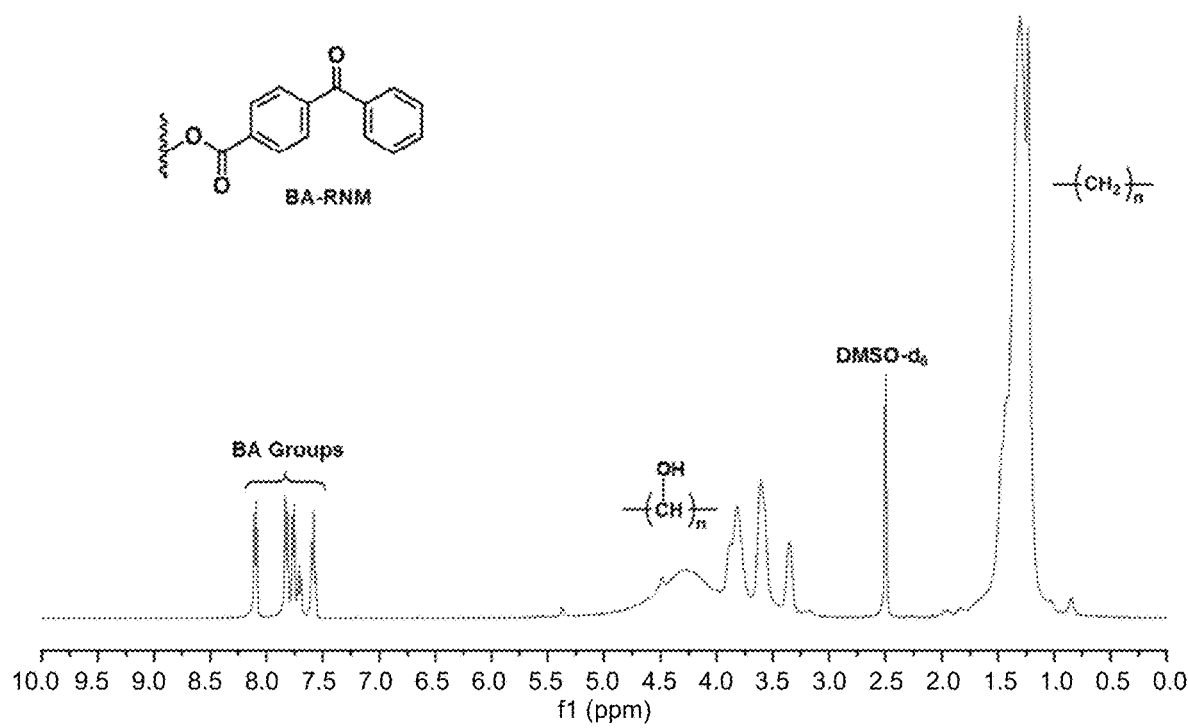
FIG. 5 is a $^1$H-NMR spectrum of a BA-RNM sample.
Figure 6:
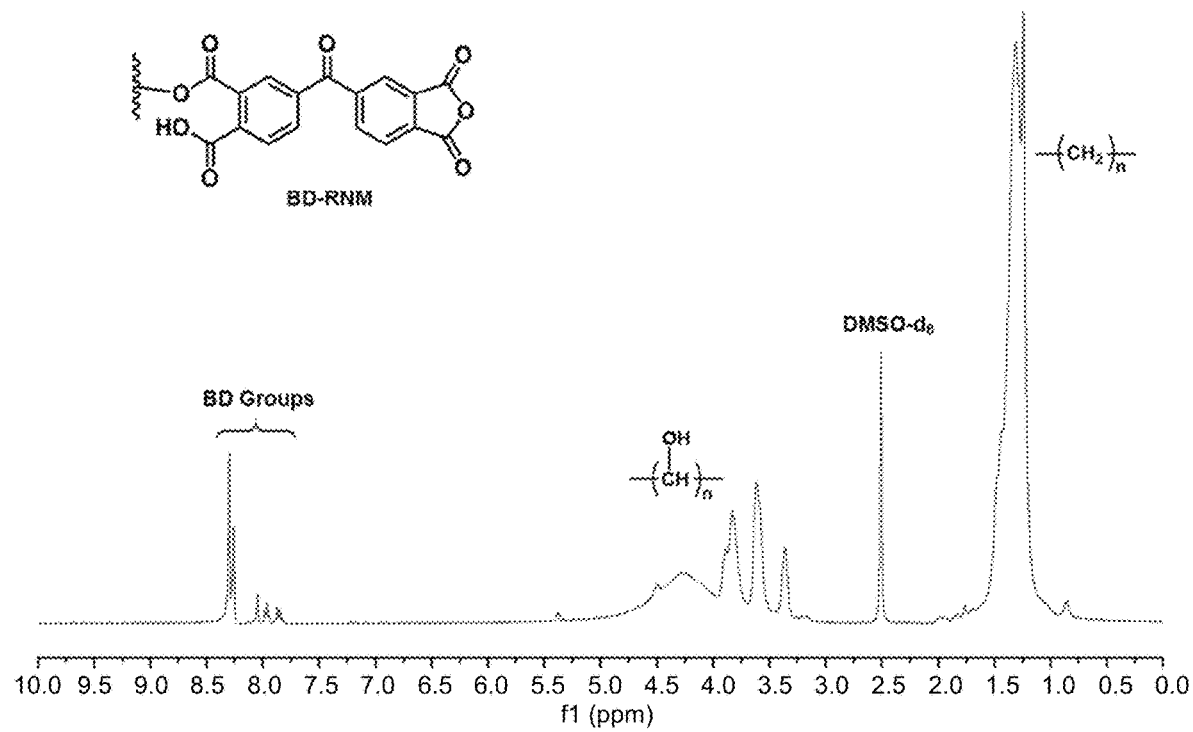
FIG. 6 is a $^1$H-NMR spectrum of a BD-RNM sample.
Figure 7:
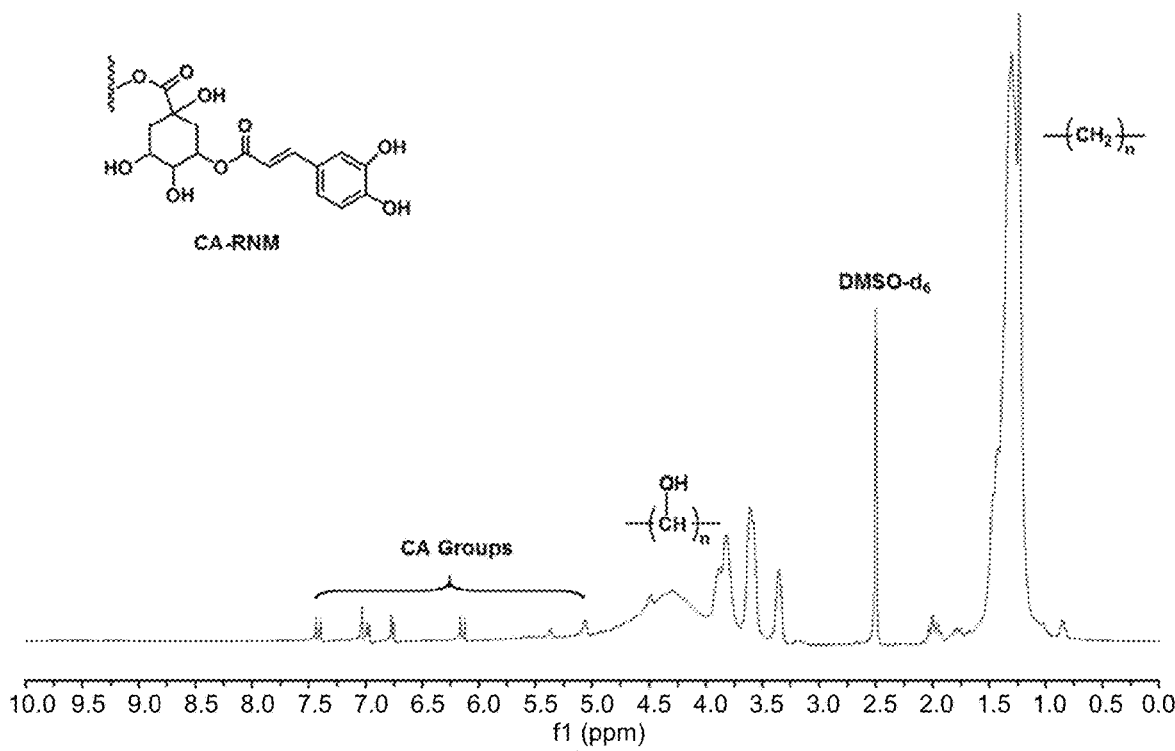
FIG. 7 is a $^1$H-NMR spectrum of a CA-RNM sample.

FIG. 1 illustrates the synthesized structures that included two classes of benzophenone with different substituents (4-benzoylbenzoic acid (BA) and benzophenone tetracarboxylic dianhydride (BD)), a natural polyphenol (chlorogenic acid (CA)), and a novel compound of benzophenone tetracarboxylic acid with chlorogenic acid (BDCA). Poly(vinyl alcohol-co-ethylene) (PVA-co-PE) was used as a polymer precursor and hydrogen donor to construct the nanofibrous networks. The fabrication began with the electrospinning production of PVA-co-PE nanofibrous membranes (FIG. 2) having an average fiber diameter of 226 nm (FIG. 3). Subsequently, grafting reactions were carried out by immersing the membranes in a tetrahydrofuran solution with various photosensitizers, and esterification reactions between the hydroxyl groups on the membrane and carboxyl groups on the agents were catalyzed by carbonyldiimidazol (FIGS. 4-7). Thereafter, the resulting membranes were washed with acetone and dried under a vacuum to remove any residual solvents. The nanofibrous membranes modified by BA, BD, and CA were abbreviated as BA-RNM, BD-RNM, and CA-RNM, respectively.

Figure 8:
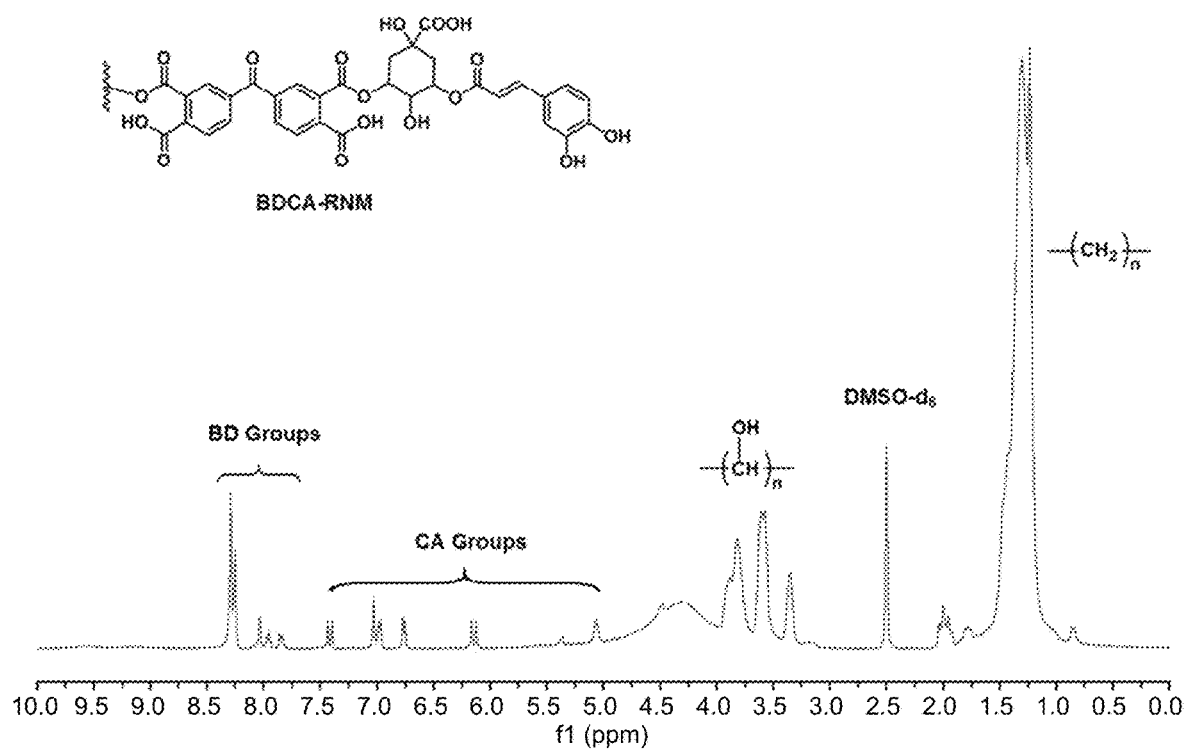
FIG. 8 is a $^1$H-NMR spectrum of a BDCA-RNM sample.
Figure 9:
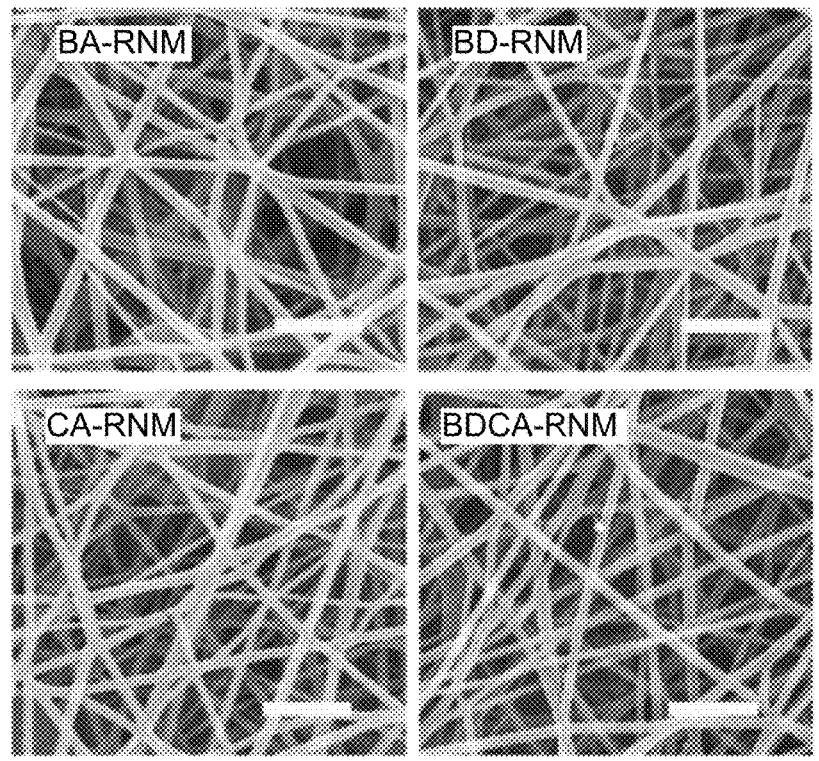
FIG. 9 presents a series of microscopic images of the architecture of various RNM samples.
Figures 10A, 10B:
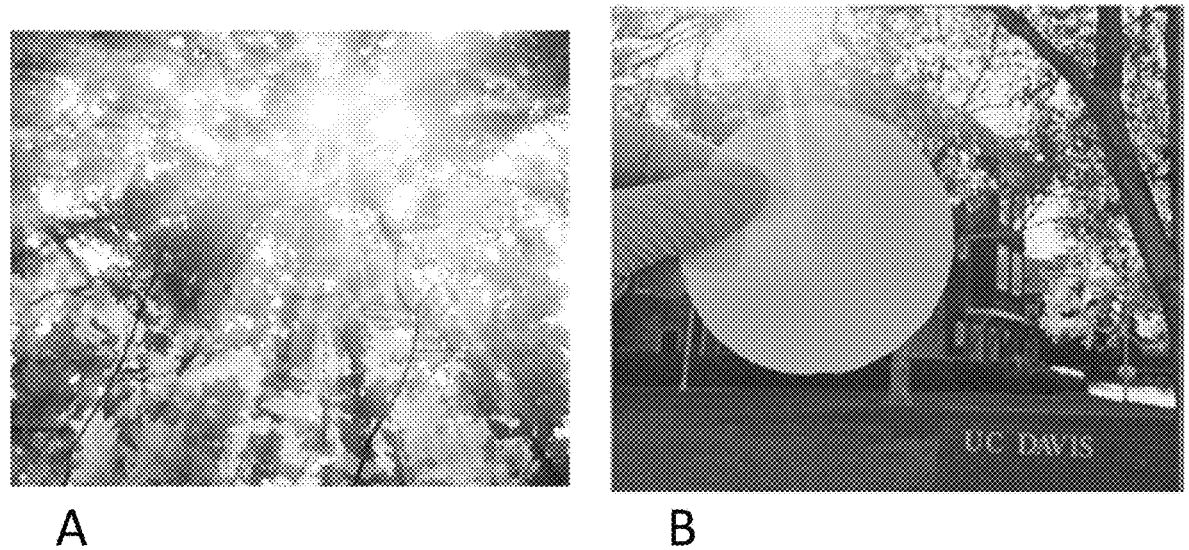
FIGS. 10A-10B present an optical photograph of a BDCA-RNM sample.
Figure 11:
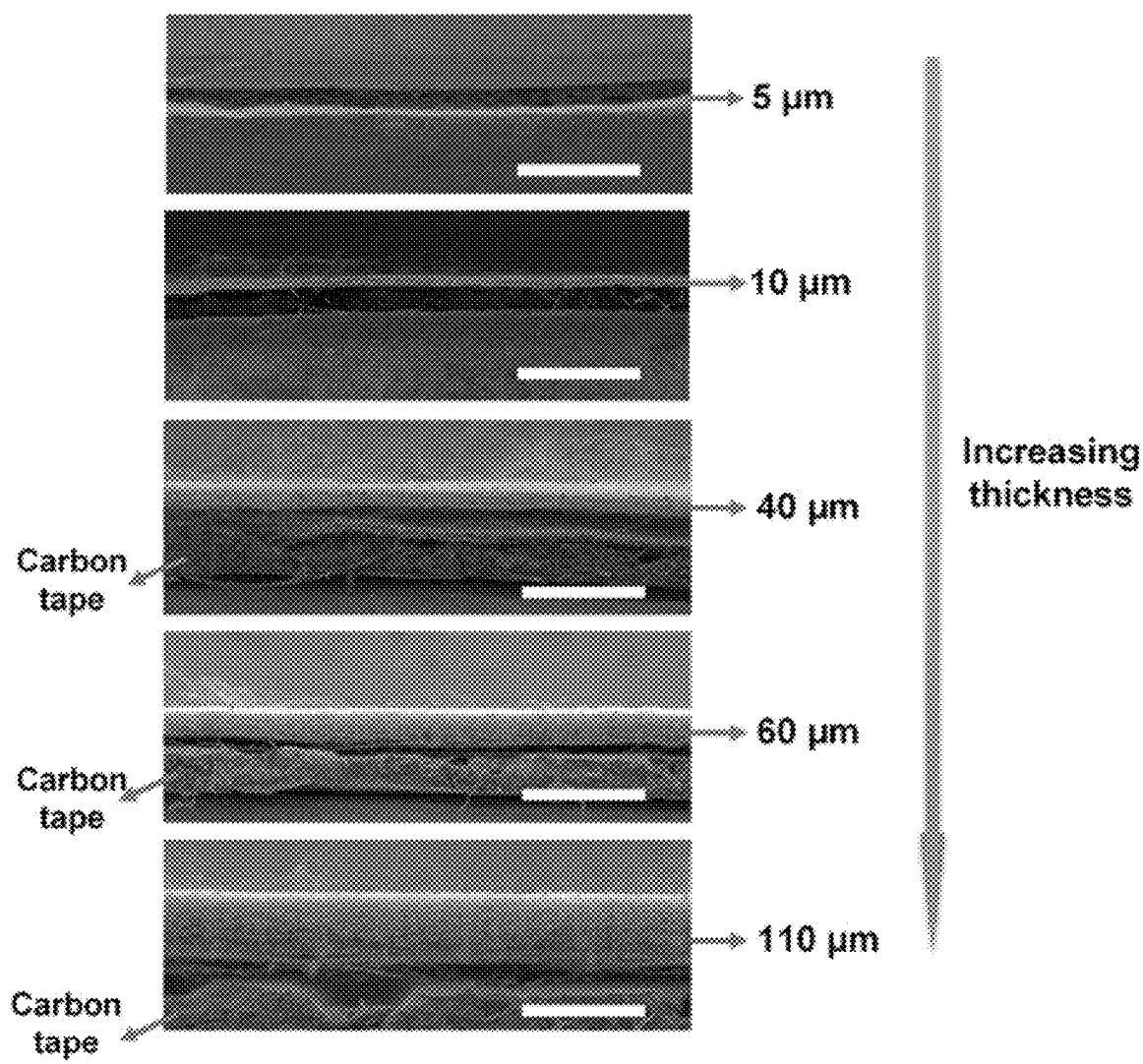
FIG. 11 presents a series of SEM images of BDCA-RNM samples with thicknesses ranging from 5 to 100 m.

To test for a synergistic effect, the BD-RNM was further grafted with CA to obtain BDCA-RNM samples (FIG. 8). The representative FE-SEM images of the relevant samples presented in FIG. 9 reveal randomly oriented 3D nonwoven morphology with fiber diameters in the range of 200-250 nm. Obvious adhesive and fusion was observed among nanofibers, which could be attributed to the surficial swell of nanofibers during the grafting reactions. Due to the simplicity of the modification process in our methodology and the facile availability of electrospun nanofibers, great versatility in controlling the thickness and scaling up the synthesis is feasible. FIGS. 10A-10B showed an image of a typical BDCA-RNM with a thickness of 20 μm, and other samples with the thickness from 5-100 μm were readily prepared (FIG. 11). A large-scale BDCA-RNM with a size of 30×30 cm$^2$ can also be readily prepared using a multi-needle spinning device.

Example 2: Biocidal Effects of Rechargeable Nanofiber Membranes

Figure 12:
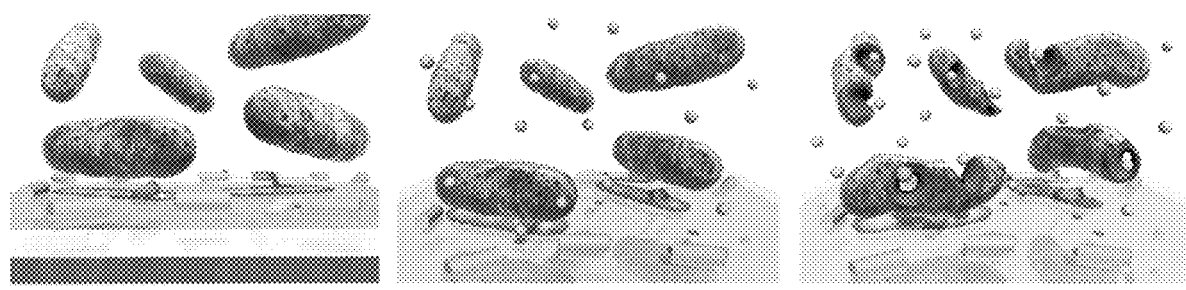
FIG. 12 is a schematic illustration of the biocidal functions of RNMs, including the release of reactive oxygen species (ROS).

FIG. 12 illustrates the biocidal effect of RNMs against pathogenic microbes. Once the pathogens are intercepted and in contact with the surface of the nanofibers, the grafted photo-biocides can display an intrinsic biocidal activity as free chemicals. In the presence of oxygen, various ROS including hydroxyl radicals (·OH), superoxide (·$O_2$—), and hydrogen peroxide ($H_2O_2$) are produced continuously. ROS can further rapidly damage DNA, RNA, proteins, and lipids, resulting in bacterial death and virus inactivation.

Figure 13:
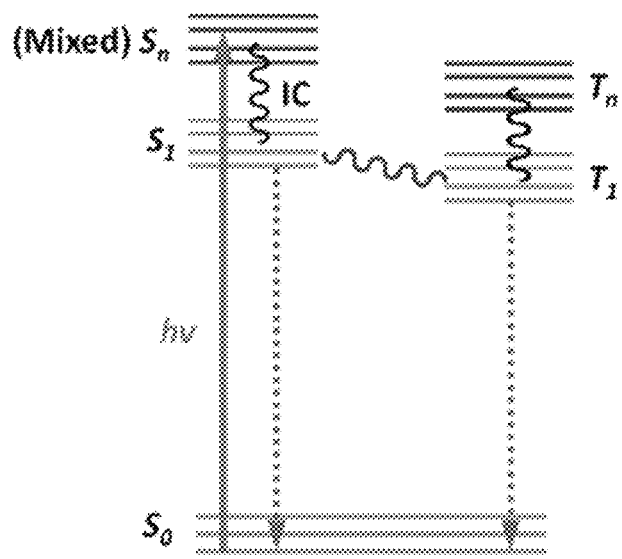
FIG. 13 is a Jablonski diagram representing singlet excitation and intersystem crossing into triplet.
Figure 14:
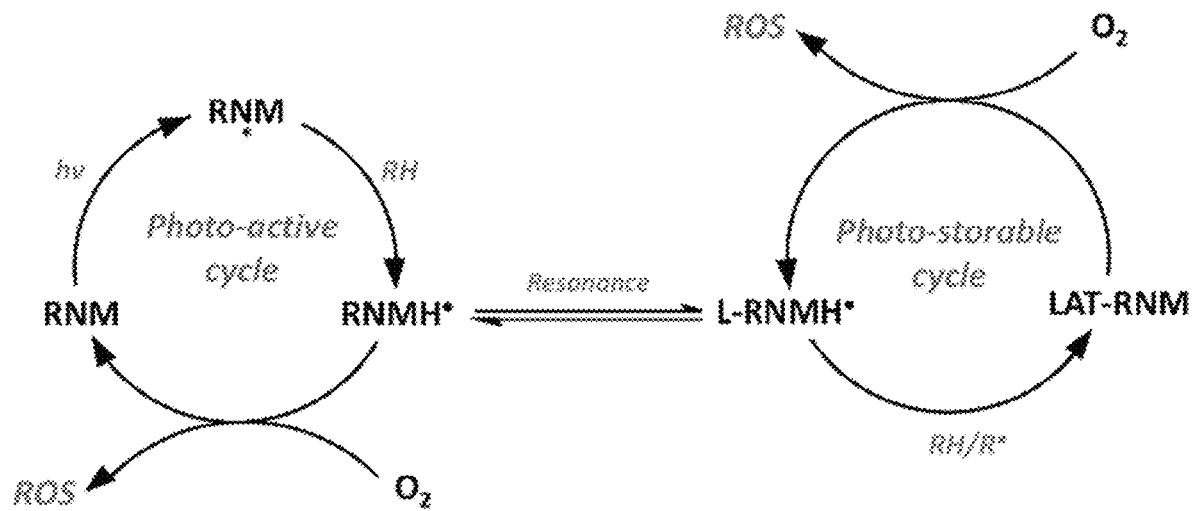
FIG. 14 illustrates a mechanistic pathway for the photo-activation and photo-storage of biocidal properties.

Without intending to limit the invention, a proposed mechanism for the photoactive and photo-storable biocidal functions is illustrated in FIGS. 13 and 14. The initial photoreaction hinges on the ability of the photo-excited RNM to access the triplet excited state (3RNM*) via intersystem crossing (ISC), which can be of local excitation or charge transfer character, depending on the relative configuration of the π* orbital. Thereafter, 3RNM* can abstract a hydrogen atom from a hydrogen donor to form a quinone radical (RNMH·). Under aerobic conditions, the RNMH· can be trapped by oxygen molecules, going back to RNM and simultaneously yielding active ROS. Meanwhile, if a generated RNMH· is not fully quenched by oxygen, a competing reaction including structure rearrangement and second hydrogen abstraction can occur, leading to the formation of a meta-stable structure that stores the activity. This activity can readily release in the form of generating ROS, even under dark conditions.

Example 3: Excitation Features of RNMs

Figure 15:
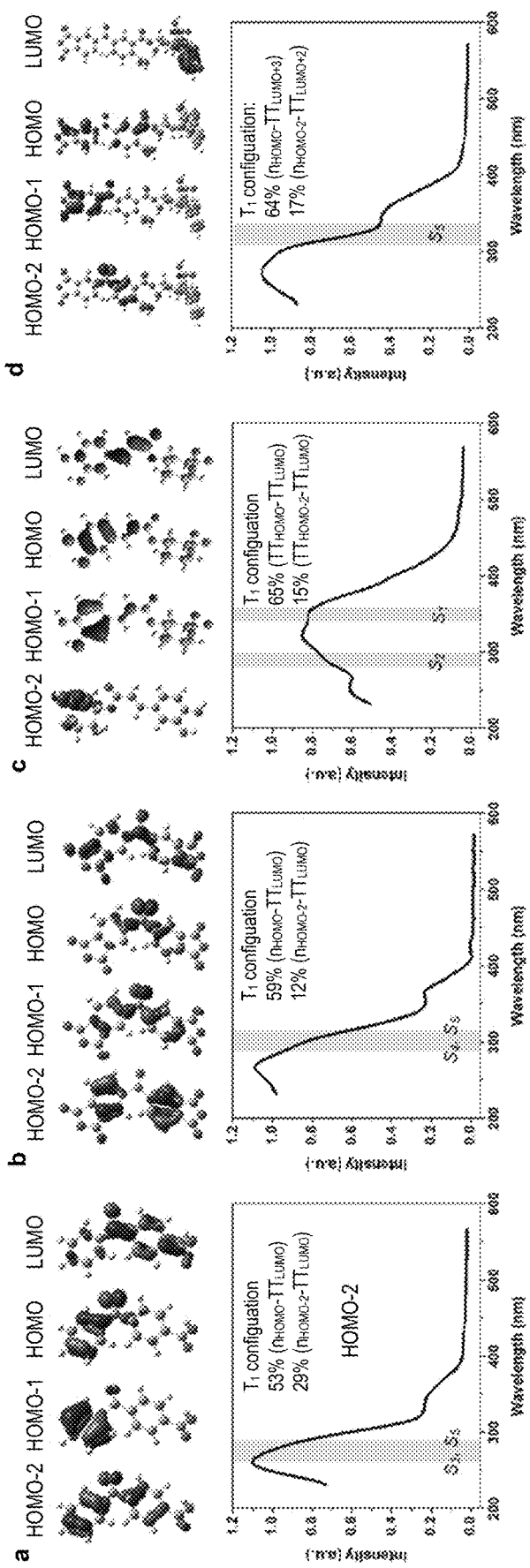
FIG. 15 presents a series of graphs of the diffuse reflection UV-vis spectra of (1) BA-RNM, (b) BD-RNM, (c) CA-RNM, and (d) BDCA-RNM, along with theoretically assigned percentage contributions (>10%) of $T_1$ orbitals, with $\lambda_{max}$ being the predicted maximum absorption wavelength.
Figure 16:
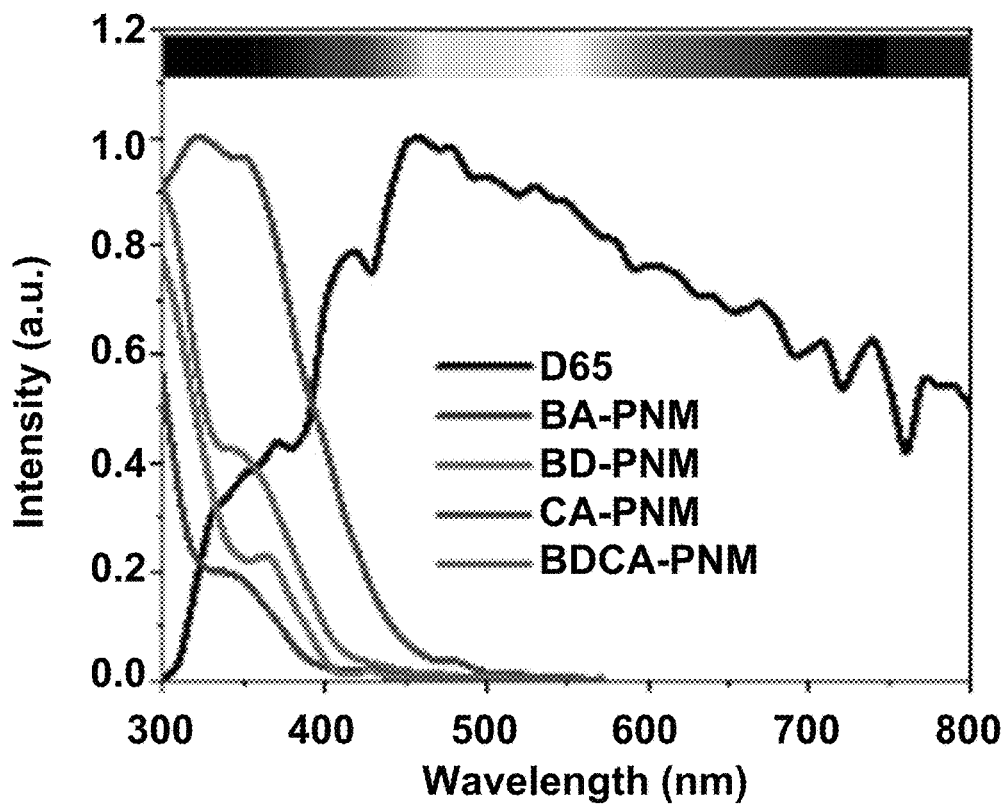
FIG. 16 is a graph of normalized UV-vis spectra of various RNM samples along with the spectrum of a D65 standard light source.

To provide insight into the excitation features of the RNMs, time-dependent density functional theory (TD-DFT) calculations and diffuse reflection UV-vis spectroscopy were used to evaluate the nature of the initial photoexcitation event. From Table 1, The TD-DFT calculations of the RNMs predict that the lower energy $S_0 \rightarrow S_1$ excitations are dominantly dark with very weak oscillator strength. Meanwhile, the $S_0 \rightarrow S_n$ excitations of the RNMs are predicted to be bright, and the calculated maximum wavelength ($\lambda_{max}$) matched with the measured UV-vis spectra, as shown in FIG. 15. The $\lambda_{max}$ of BA-RNM, BD-RNM, CA-RNM, and BDCA-RNM were 275, 307, 336, and 332 nm, respectively. Although these $\lambda_{max}$ values were mainly located in UV range, compared with the standard spectrum of D65 daylight, light energy in the range from 300 to 450 nm can be still readily utilized by the RNMs, as shown in FIG. 16. The estimated daylight absorbance coefficients for BA-RNM, BD-RNM, CA-RNM, and BDCA-RNM were 21.62%, 35.33%, 66.04%, and 45.41%, respectively, indicating a robust utilization of daylight source.

TABLE 1

Singlet excitation wavelengths and oscillator strengths (f) of the relevant RNMs by TD-DFT calculations.

| Excited States | BA-RNM | BD-RNM | CA-RNM | BDCA-RNM |
|---|---|---|---|---|
| $S_1$ | 347.21 nm | 366.67 nm | 341.471 nm | 400.21 nm |
|  | f = 0.0000 | f = 0.0026 | f = 0.3140 | f = 0.002 |
| $S_2$ | 301.34 nm | 334.36 nm | 294.92 nm | 364.15 nm |
|  | f = 0.0144 | f = 0.0141 | f = 0.4892 | f = 0.0032 |
| $S_3$ | 291.53 nm | 315.47 nm | 267.53 nm | 334.03 nm |
|  | f = 0.2697 | f = 0.0089 | f = 0.0001 | f = 0.0001 |
| $S_4$ | 287.23 nm | 307.21 nm | 249.79 nm | 333.92 nm |
|  | f = 0.0121 | f = 0.0934 | f = 0.3248 | f = 0.0036 |
| $S_5$ | 283.18 nm | 307.03 nm | 248.47 nm | 325.22 nm |
|  | f = 0.1489 | f = 0.0451 | f = 0.0006 | f = 0.5306 |
| $S_6$ | 277.54 nm | 304.68 nm | 247.51 nm | 322.77 nm |
|  | f = 0.1279 | f = 0.0066 | f = 0.0322 | f = 0.0171 |

After initial photon absorption, fast relaxation via internal conversion (IC) results in thermalization of the excited electron from $S_n$ to the lowest singlet excited state $S_1$, followed by ISC to the lowest triplet excited state ($T_1$), from wherein a series of photo-reactions can originate. Interestingly, inspection of the frontier orbitals of $T_1$ reveals qualitative differences in these RNMs. The BA-RNM and BD-RNM possess similar $n_{HOMO}$-$\pi_{LOMO}$ transitions in $T_1$, with both n electron localized on carbonyl group and it electron localized over the entire conjugate system. In contrast, the CA-RNM exhibited a typical $\pi_{HOMO}$-$\pi_{LOMO}$ transition with both it and π* orbitals localized on phenyl ring system. Moreover, by the combination of the benzophenone and the polyphenol, the $T_1$ of BDCA-RNMs exhibit unique charge transfer character with an $n_{HOMO}$-$\pi_{LUMO}$+3 transition, wherein an electron occupying HOMO orbital, which is an n orbital localized on the carbonyl group in benzophenone, is promoted into the spatially separated π* LUMO+3 localized on the conjugated system of CA.

Example 4: ROS Photoactivity of RNMs

Figure 17:
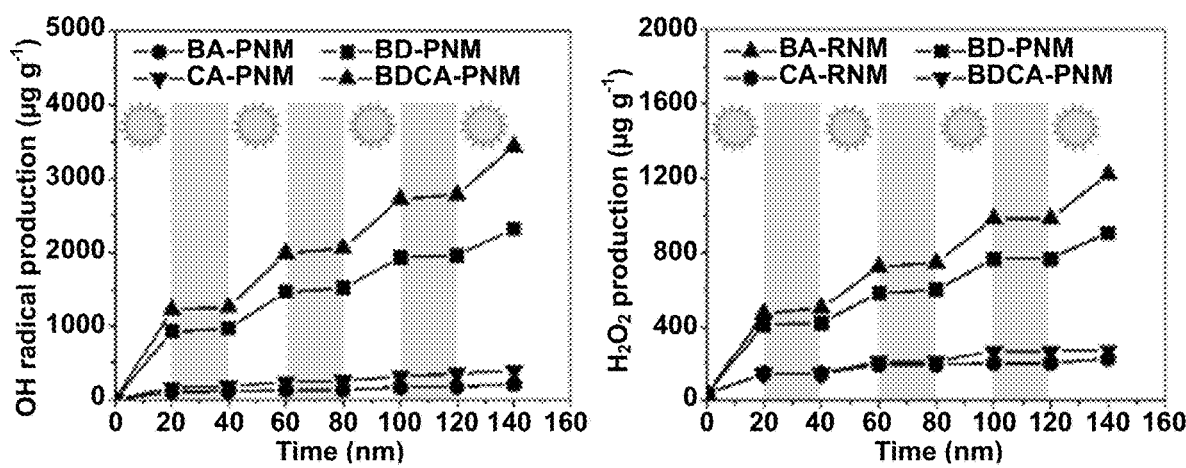
FIG. 17 presents graphs of OH· and $H_2O_2$ generated by various RNM samples during periods of irradiation and darkness.

To test the photo-activity of some relevant RNMs, a daylight irradiation device with an irradiance of 6.5 mW cm$^{-2}$ was equipped with an easily available light source—a D65 standard daylight tube (GE F15T8/D)—and the formed ROS were measured in terms of two typical species: OH· and $H_2O_2$. The relevant RNMs were subjected to a cyclic irradiation test with 20 min interval light-dark fatigue cycles. As shown in FIG. 17, generation of OH· and $H_2O_2$ was mainly observed during irradiation and paused during dark periods, and the amount of ROS steadily increased after irradiation with no significant decrease in activity. The BD-RNM and BDCA-RNM exhibited robust photo-activity while the BA-RNM and CA-RNM only showed poor ROS generation capacity. Significantly, the BDCA-RNMs exhibited the highest OH· and $H_2O_2$ generation capacities of 49.96 and 15.26 μg g$^{-1}$ min$^{-1}$, respectively, which were 1-2 orders of magnitude higher than those of conventional daylight-driven photoactive materials.

Figure 18:
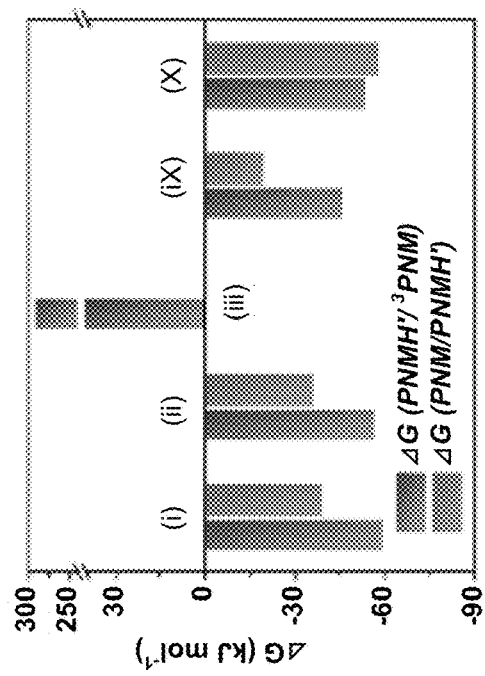
FIG. 18 is a graph of the calculated ΔG of RNMH·/$^3$RNM* and RNM/RNMH· transitions.

Without intending to be bound by theory, the photo-induced ROS generation cycle involves the hydrogen abstraction (RNMH·/$^3$RNM) by the triplet RNMs and a subsequent oxidation (RNM/RNMH·) by oxygen. To provide insight into the mechanism of the photo-induced reaction, DFT was used to calculate the energy of the relevant reaction moieties (Table 2). The reaction feasibility was also quantified using Gibbs free energy (ΔG). As shown in FIG. 18, both BA-RNM and BD-RNM exhibited obvious negative ΔG(RNM/RNMH·) and ΔG(RNMH·/$^3$RNM), revealing that the hydrogen abstraction and oxidation reactions were highly spontaneous. However, the poor daylight absorption ability of BA-RNM resulted in its weak photo-activity. In contrast, the CA-RNM showed significantly high ΔG(RNM/RNMH·) of 290 kJ mol$^{-1}$ due to the inactive π-π triplet transition, which means that the hydrogen abstraction largely does not occur to form active radicals; thus, further ROS generation was also disabled in spite of the high excitation rate. Moreover, benefiting from the unique charge transfer feature of n-r transition, the BDCA-RNM exhibited high reactivity for both intra- and inter-molecularly photoreaction, leading to the robust ROS generation efficiency.

Figure 19:
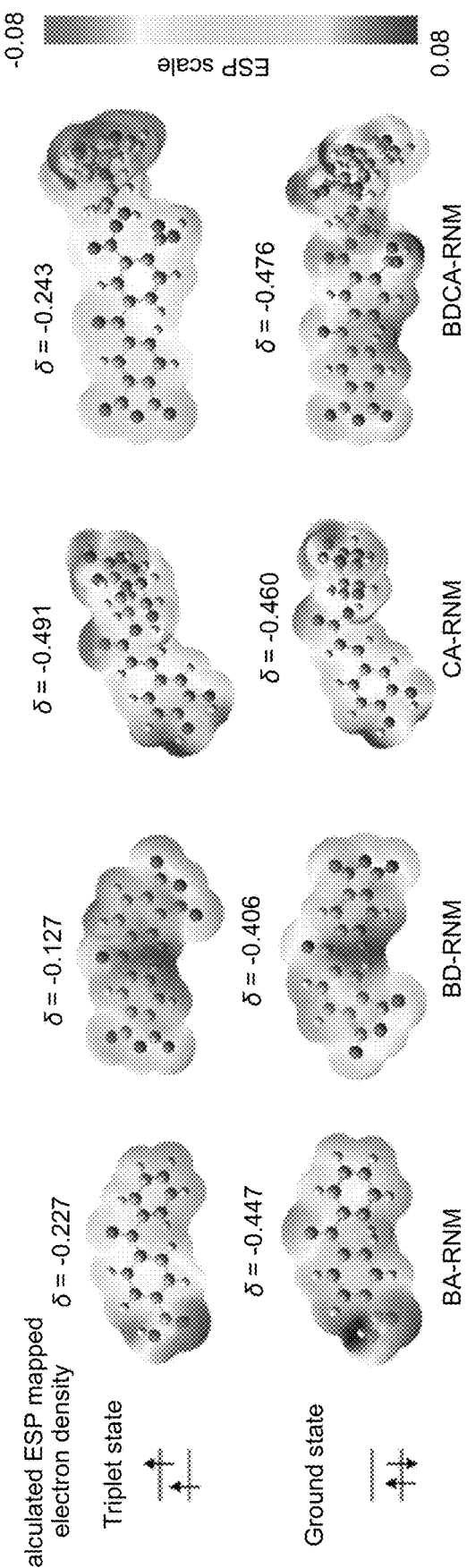
FIG. 19 illustrates the ESP mapped electron density of the ground state and $T_1$ state of various RNMs samples.

These results were further supported by the electrostatic potential (ESP)-mapped electron density of the $T_1$ and ground state of these RNMs. As shown in FIG. 19, the $T_1$ states of BA-RNM, BD-RNM, and BDCA-RNM exhibited obvious electron deficiency character on the oxygen atom in carbonyl group comparing with ground state, implying the high tendency for hydrogen abstraction. In contrast, a slight increase of ESP in carbonyl oxygen was observed for CA-RNM, resulting in the inactive $T_1$ states. Without intending to be bound by theory, these results suggest that the photo-activity of the RNMs is dictated both by the light absorbing capability (that is, the transition to singlet state) and the character of the $T_1$ triplet state (excitation configuration and structure of frontier orbital).

TABLE 2

Gibbs free energy (with unit in Hartree) of the relevant reaction moieties of RNMs by DFT calculations.

| States | BA-RNM | BD-RNM | CA-RNM | BDCA-RNM (intra-) | BDCA-RNM (inter-) |
|---|---|---|---|---|---|
| RNM | −765.0991 | −1177.9609 | −1297.3255 | −2474.5989 | −2475.2237 |
| $^3$RNM* | −765.0051 | −1177.8690 | −1297.4032 | −2475.1422 | −2475.1422 |
| RNMH· | −765.6704 | −1178.5332 | −1297.9338 | −2475.1628 | −2475.8023 |

Example 5: Rechargeable Biocidal Properties of RNMs

Figure 20:
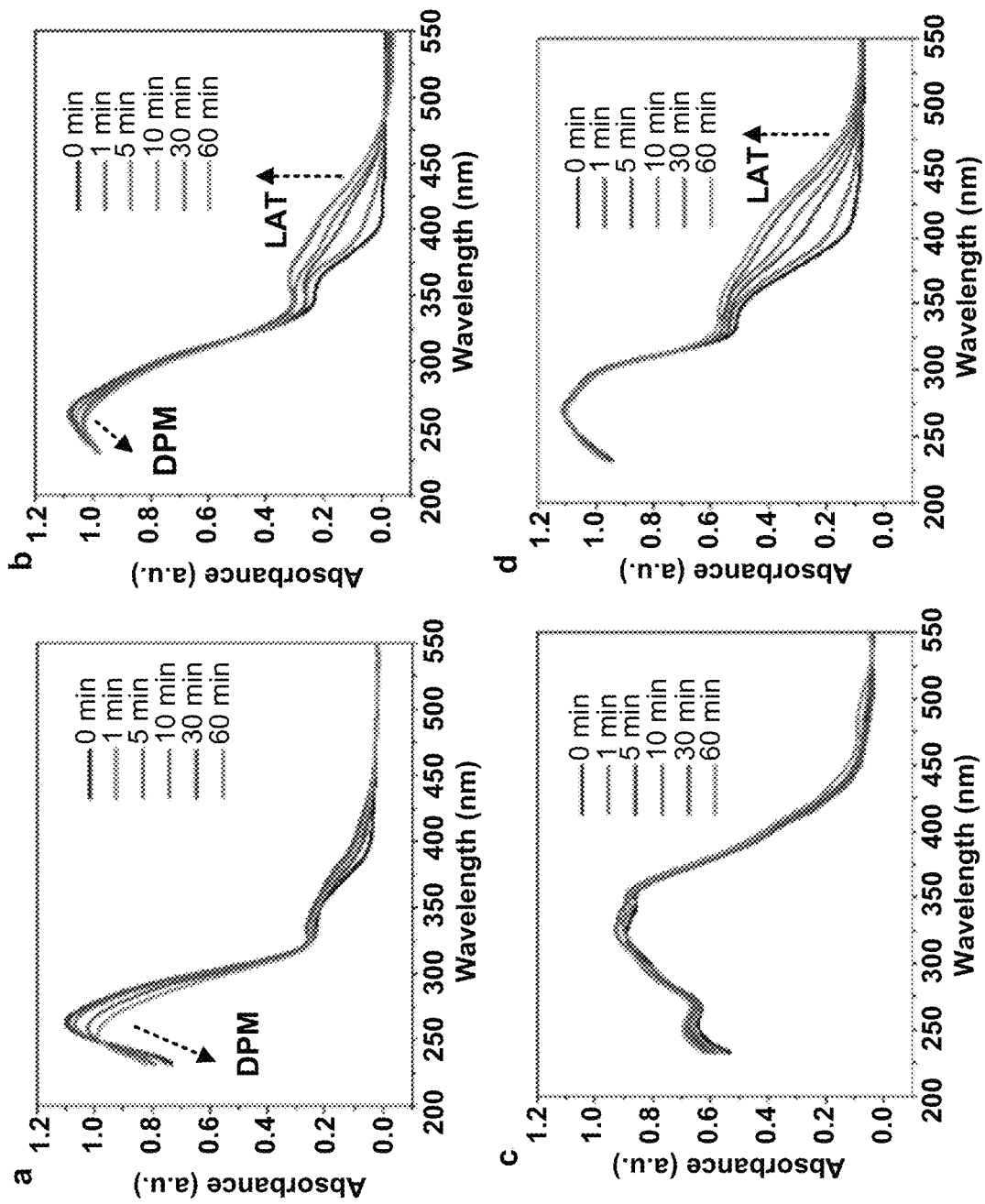
FIG. 20 presents a series of graphs of the UV-vis spectra of (a) BA-RNM, (b) BD-RNM, (c) CA-RNM, and (d) BDCA-RNM under increasing daylight irradiation time.
Figure 21:
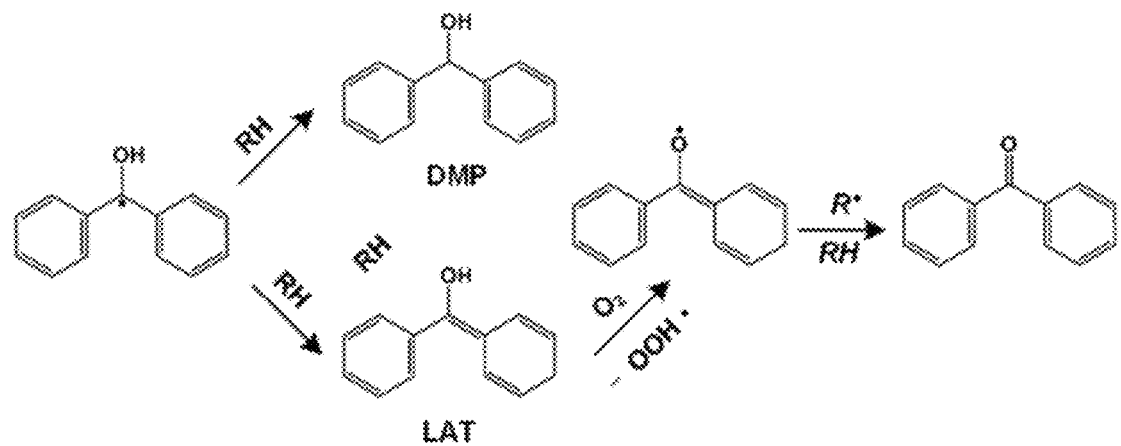
FIG. 21 is a reaction scheme for the formation of diphenylmethanol (DPM) and light-absorbing transient (LAT) structures.

The properties of photoactive nanofibrous-structured RNMs can be further demonstrated by their promising rechargeable biocidal functions. Without intending to be limited by theory, the photoactive cycle consists of the excitation, hydrogen abstraction, and quenching by oxygen. However, if the generated RNMH· is not fully quenched by oxygen or other organic burdens (for example, microbial), other competing reaction related to activity storage can occur. To demonstrate this, the relevant RNMs were irradiated under daylight with increasing exposure times up to 60 minutes, and the photo-induced reaction and structure rearrangement were studied with UV-vis spectroscopy and TD-DFT calculations, as shown in FIG. 20. The BA-RNM spectrum shows an obvious absorption peak shift from 275 to 262 nm, characteristic of the formation of reduced moieties in diphenyl methanol form. Meanwhile, in addition to DPM formation, distinct absorption increase was observed at 440 nm for BD-RNM, indicating the formation of a meta-stable transient photoproduct referred to as the "light-absorbing transient" moieties. Similarly, the BDCA-RNM exhibited even more distinct LAT formation without DPM transition. No visible change was recorded for CA-RNMs, due to poor hydrogen abstraction ability. The formed DPM photoproduct was quite stable and unable to revert to the original benzophenone states. Additionally, the LAT moieties were proven to be oxygen-sensitive, and readily quenched and reversed to benzophenone by some reducing agents in the presence of oxygen to regenerate the photoactivity. Without intending to be bound by theory, a detailed mechanistic proposal for the rechargeable reactions of RNMs in the presence of oxygen is shown in FIG. 21.

Figure 22:
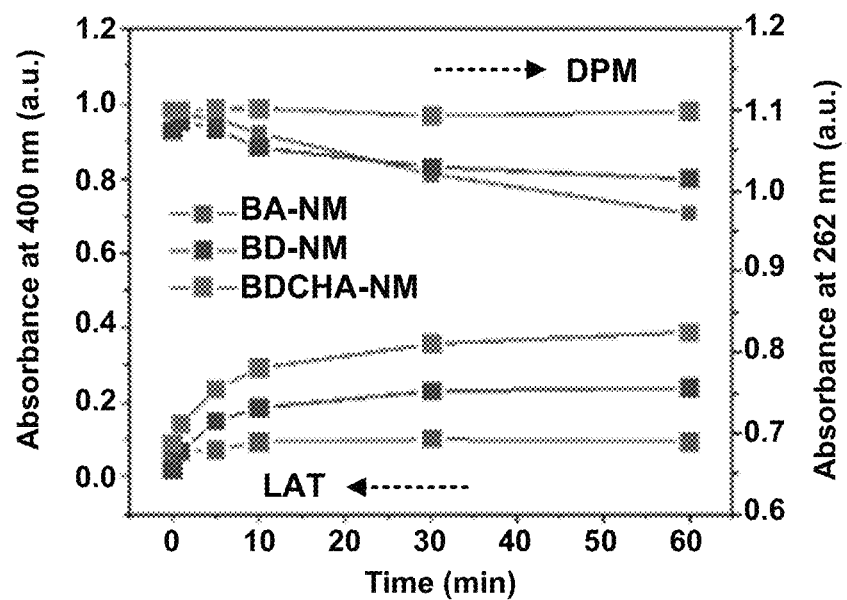
FIG. 22 is a graph of the representative absorbance of RNMs at 262 nm (DMP) and 440 nm (LAT) as a function of irradiation time.
Figure 23:
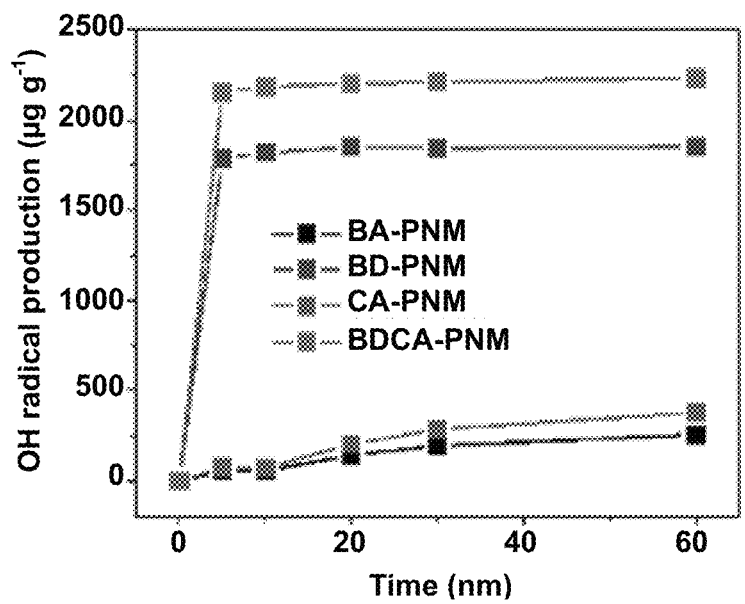
FIG. 23 is a graph of OH· released by various RNMs in dark conditions after 1 hour of daylight irradiation.
Figure 24:
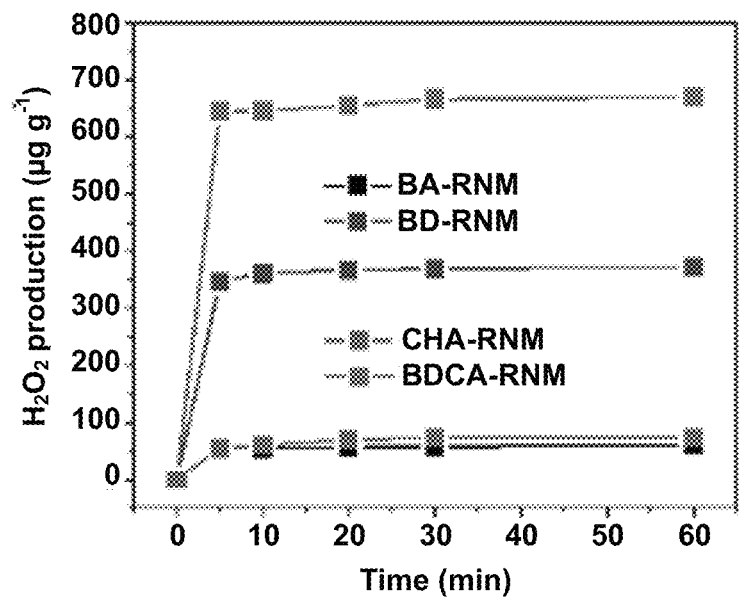
FIG. 24 is a graph of $H_2O_2$ released by various RNMs in dark conditions after 1 hour of daylight irradiation.

The photo-induced structural reorganization of RNMs by typical absorption intensity change related was further compared to DPM (262 nm) and LAT (440 nm) structures. As shown in FIG. 22, the BDCA-RNM exhibited negligible DPM formation while possessing the maximum LAT transition ability, indicating that the activity-stored structure was able to recover with minimal functional decaying. To quantify the ROS rechargeable capability, the relevant RNMs were first charged by 1 hour of daylight irradiation, then the releasing activity under dark condition was measured in terms of the amount of OH· and $H_2O_2$. As shown in FIGS. 23 and 24, in contrast to the gradually ROS generation in irradiation tests, the RNMs rapidly released more than 90% of ROS in the first 5 minutes, and then showed a saturated releasing ability with ROS amounts increasing slowly. As expected, the BDCA-RNM exhibited the highest recharging capacity with OH· and $H_2O_2$ releasing amounts of 2332 and 670 µg g$^{-1}$ by 1 hour of daylight charging, corresponding to the charging rates of 38.86 and 11.16 µg g$^{-1}$ min$^{-1}$, respectively, indicating that the light energy was largely utilized with over 70% conversion efficiency as compared to the irradiation tests.

Figure 25:
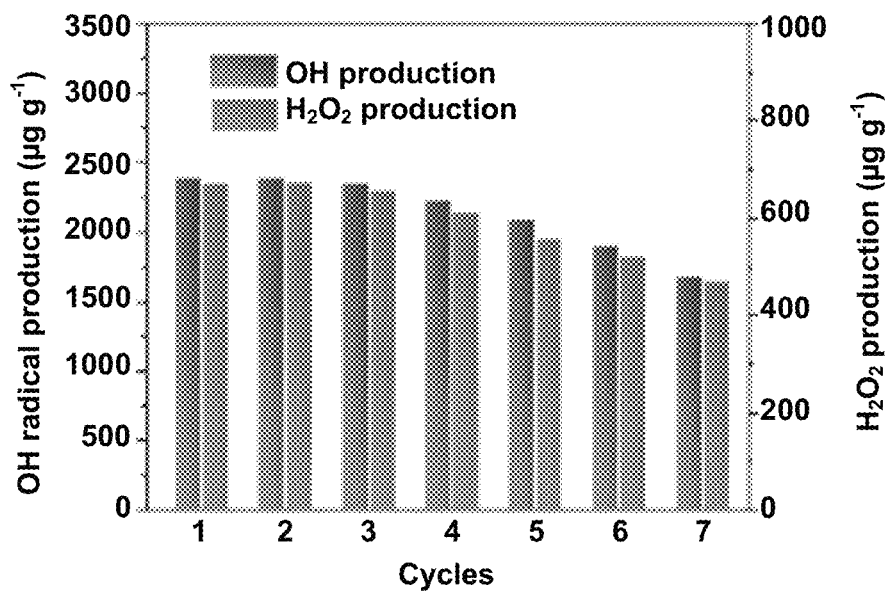
FIG. 25 is a graph of the rechargeable capability of BDCA-RNM when repeatedly charging and quenching over 7 cycles.
Figure 26:
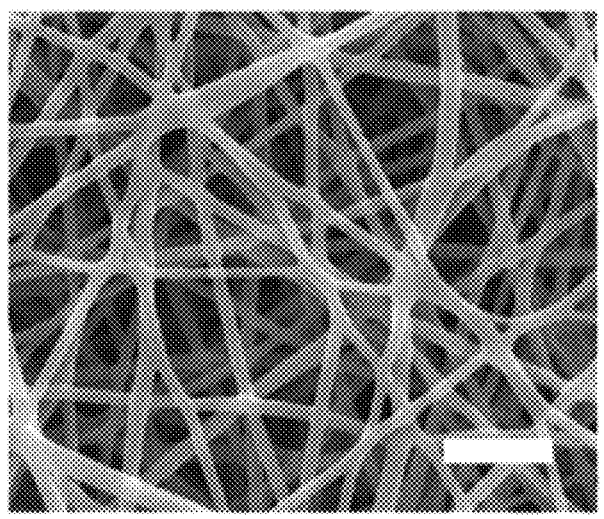
FIG. 26 is an FE-SEM image of BDCA-RNM after 7 cyclic recharging tests.

A recharging cyclic test of BDCA-RNM was also performed as indicated in the graph of FIG. 25. For each cycle, the BDCA-RNM samples were first irradiated for 1 hour and were fully quenched with an excess amount of a thiosulfate solution. No significant decrease in the recharging capacity was observed for BDCA-RNM after 7 cyclic tests, indicating they retained over 75% of the original charging amount of OH· and $H_2O_2$. The nanofibrous architecture was also well maintained during the cycles of recharging, as seen in the image of FIG. 26. The slight decrease of the capacity could be attributed to the accumulative consumption of the nonrenewable tertiary hydrogen in the PVE-co-PE nanofiber matrix.

Figure 27:
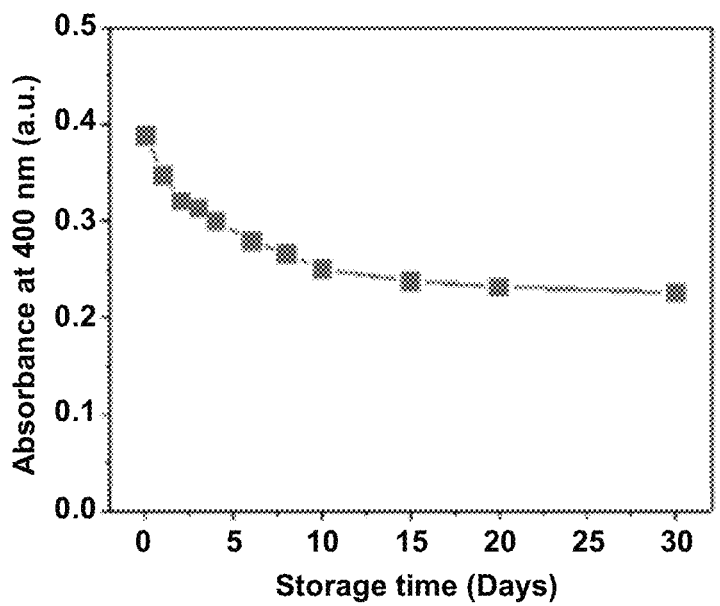
FIG. 27 is a graph of the change of LAT structure of BDCA-RNM versus storage time. (scale bar=2 µm)

In addition, stability for long-term storage of the LAT structure is another practical concern for recharging performance. A decay of the LAT structure has a notable impact on the existence of oxygen and reductive organic matters, which could lead to a quick release of ROS. Therefore, if the RNMs were stored in a dry and closed condition, the absorption band associated with the LAT structure should exhibit slow decays, as observed in FIG. 27. Measurements from a storage test over the course of 30-days revealed that the BDCA-RNM still retained over 55% of the original LAT structure, highlighting its structural stability.

Example 6: RNM Antibacterial Activity

Figure 28:
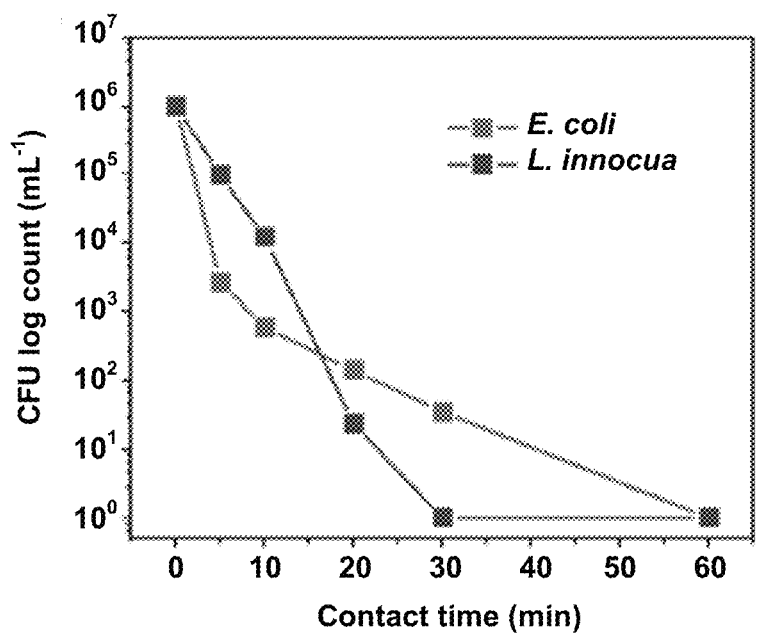
FIG. 28 is a graph of the bactericidal activity of BDCA-RNM against E. coli and L. innocua under daylight irradiation.

To evaluate the antibacterial activity of the RNMs, the membrane surfaces were first challenged with two typical pathogenic bacteria, gram-negative *Escherichia coli* (*E. coli*) O157:H7 and gram-positive *Listeria innocua* (*L. innocua*). For the contact-killing assay, control (pristine PVA-co-PE nanofibrous membranes) and BDCA-RNM samples with a size of 2×2 cm$^2$ were loaded with 10 µL of 1×10$^8$ colony forming units (CFU) of a bacterial suspension (2.5×10$^5$ CFU cm$^{-2}$), and the bacterial proliferation was assessed by agar plate counting. FIG. 28 depicts the time-dependent antibacterial effect of the BDCA-RNM under daylight irradiation condition. It was found that the control samples showed significant bacterial growth during incubation even after 1 hour of the irradiation. In contrast, the BDCA-RNM showed effective killing of bacteria, achieving 6 log of CFU reduction of *E. coli* and *L. innocua* in 60 and 30 minutes daylight irradiation, respectively, corresponding to a promising contact-killing efficacy of 99.9999%. In comparison, a contact time of 5-10 hours is typical for conventional photoactive hydrogels to achieve such bacterial reductions, and prior art photoactive fibrous materials exhibit only up to 4 log CFU reduction while requiring a contact time of several hours.

Figure 29:
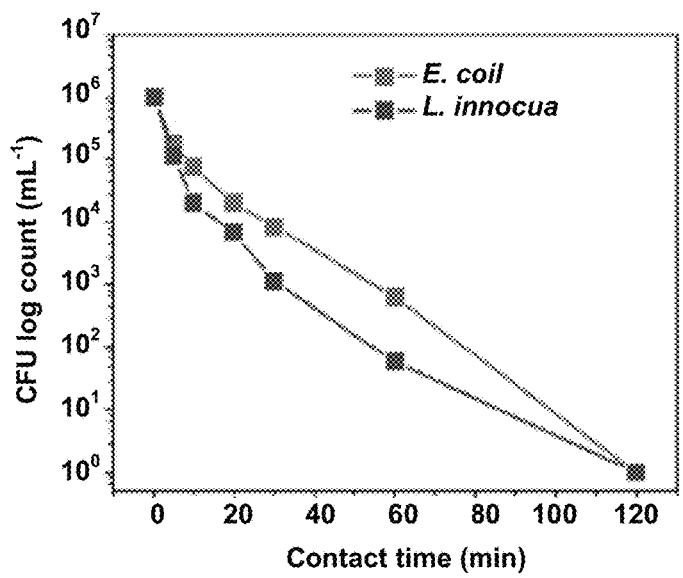
FIG. 29 is a graph of the bactericidal activity of charged BDCA-RNM against E. coli and L. innocua in dark conditions.
Figure 30:
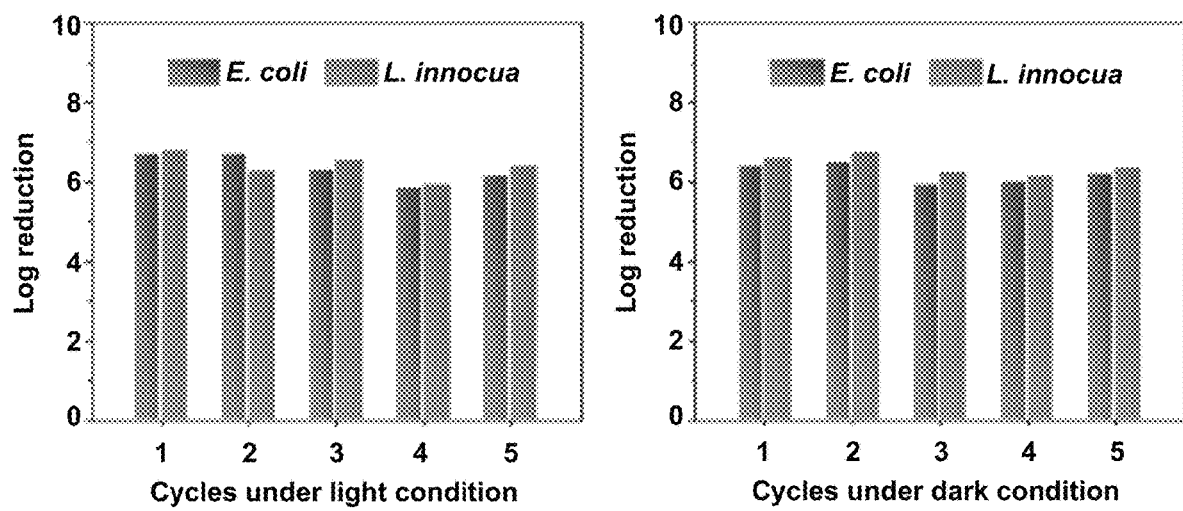
FIG. 30 presents a pair of graphs showing the results of five-cycle antibacterial tests of BDCA-RNMs under daylight irradiation and as charged and used in dark conditions.

Moreover, in dramatic contrast to traditional photo-antimicrobial materials, the BDCA-RNM can store the biocidal activity and kill bacteria under dark conditions, as shown in FIG. 29. After 1 hour of daylight exposure, the charged BDCA-RNM exhibited 6 log of CFU reduction of both *E. coli* and *L. innocua* within 120 minutes contact under a dark condition, nearly maintaining half of the biocidal efficiency seen under lighting conditions. Considering that HCWs can conceivable be required to operate under dim light or dark working conditions, such rechargeable biocidal performance is an advantageous property increasing the practicality of PPE for providing an "always on" biocidal bio-protection function. In addition, the rechargeable feature is also responsible for a renewed cyclic performance of the RNMs against microorganisms. As shown in FIG. 30, five-cycle contact-killing tests revealed the biocidal efficacy was nearly constant with 6 log CFU reduction of the bacteria, irrespective of the presence or absence of light exposure, highlighting the robust biocidal character of the BDCA-RNMs.

Figure 31:
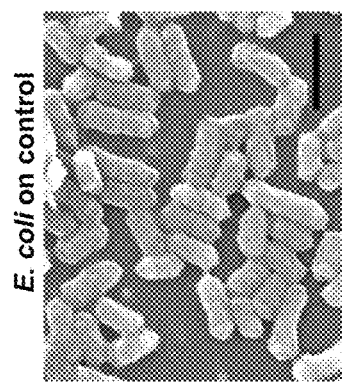
FIG. 31 presents images of the morphology of E. coli and L. innocua cells in contact with control membranes and BDCA-RNM with 1 hour daylight irradiation.
Figure 31:
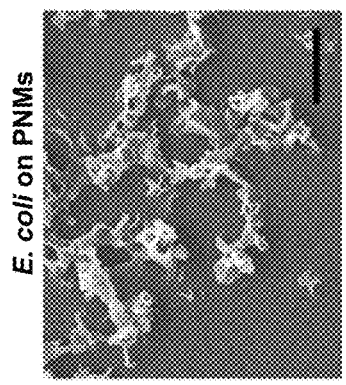
Figure 31:
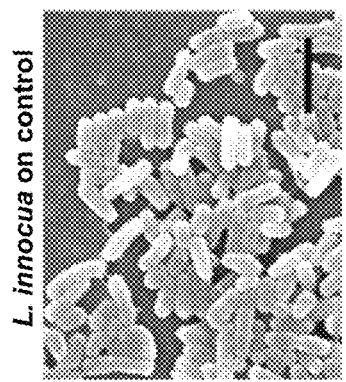
Figure 31:
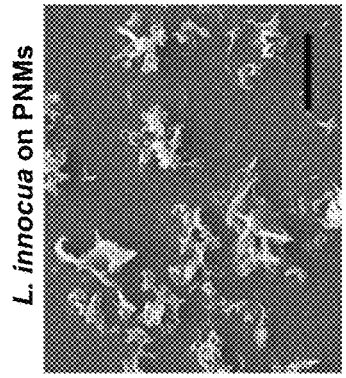
Figure 32:
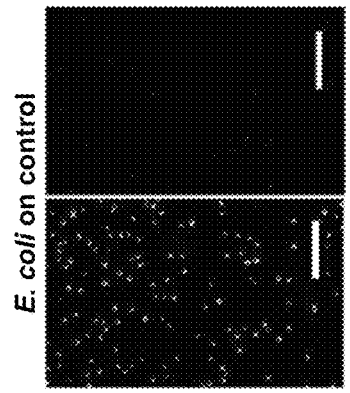
FIG. 32 presents fluorescent images of live/dead bacterial viability staining of E. coli and L. innocua cells in contact with control membranes and BDCA-RNM with 1 hour daylight irradiation.
Figure 32:
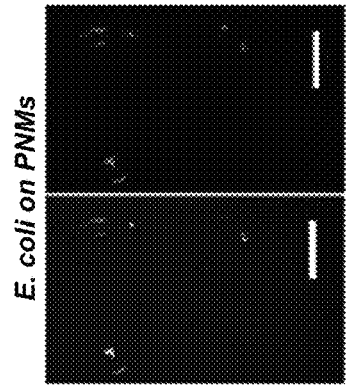
Figure 32:
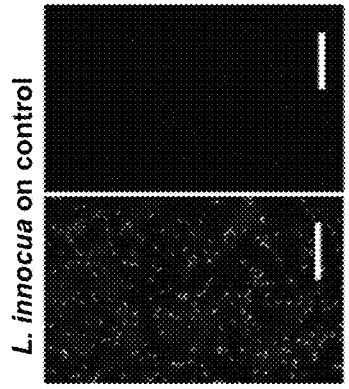
Figure 32:
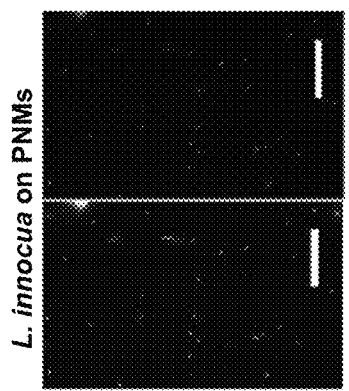

To gain insight into the bactericidal mechanism of the RNMs, the morphological changes of bacteria after contacts with the RNMs were investigated. As shown in FIG. 31, both *E. coli* and *L. innocua* cells contacting the control samples remained smooth and in their characteristic rodlike morphologies with intact cell membranes. In sharp contrast, cellular deformation and surface collapse were clearly found on the bacterial cells after exposure to the BDCA-RNM after 1 hour light exposure, with most of the cells lysed and numerous small debris clusters observed. This finding was also supported by data from live/dead bacterial fluorescence staining assays. The bacteria in contact with the control and BDCA-RNM were washed out and first stained with a cell-nonpermanent propidium iodide red (PI) dye, which is only able to penetrates cells with compromised membranes and does not cross the intact membrane of live cells. The cells were then counterstained with a cell-permeant SYBR® green (SG) dye, which can stain the nucleic acids of both intact and permeabilized cells. As shown in FIG. 32, numerous live *E. coli* and *L. innocua* were observed in green color after contacting the control samples while little red color was found. In contrast, upon 1 hour contact with the BDCA-RNM under light, the observed green fluorescence signals were significantly decreased and all cells in green color were almost exclusively in red color as well, revealing that the majority of bacterial cells were disrupted or lysed without any integrated morphology.

Figure 33:
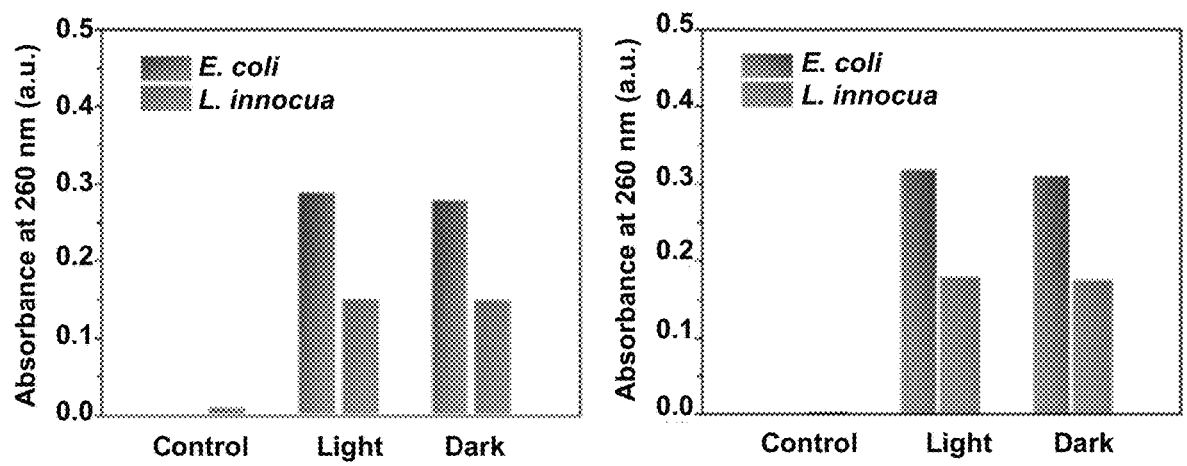
FIG. 33 presents a pair of graphs of the measurements of nucleic acid and protein leakage from E. coli and L. innocua cells in contact with control membranes and BDCA-RNM.

To further assess the damage induced on bacterial cell membranes, leakage of nucleic acids and proteins from the bacterial cells was detected after contacting with BDCA-RNM samples. Supernatants of pelleted culture were analyzed for spectrophotometric absorbance readings at 260 and 280 nm, corresponding to the characteristic peaks of nucleic acids and proteins, respectively. As shown in FIG. 33, nearly no organic matter was detected from the supernatant after contacting with the control samples. Meanwhile, significant leakage of nucleic acids and proteins were observed for the *E. coli* and *L. innocua* after contacting with BDCA-RNM, either under light exposure or dark conditions, confirming the disruption of the bacterial cell walls and membranes.

These results indicate that the bactericidal function of the BDCA-RNMs is similar to that of peroxide disinfectants commonly used in medical disinfection in that the both involve bacterial cell wall and membrane disruption. Moreover, contact killing and free ROS release are both possible mechanisms, but the contact killing plays a dominant role for the RNMs. Because the ROS radicals possess a quite short lifetime of <10 is with negligible migration distance, stable $H_2O_2$ may not be able to reach a critical biological activity level in such a short time (<10 min). Therefore, the use of the RNMs is also advantageous in avoiding undesirable free ROS release and accumulation by utilizing ROS effectively and safely.

Example 7: RNM Antiviral Activity

Figure 34:
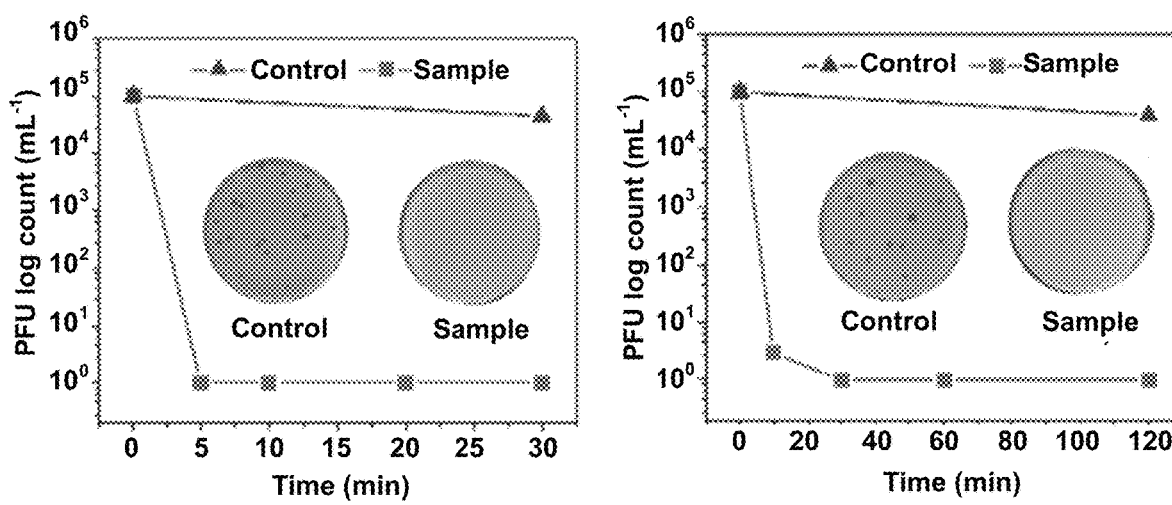
FIG. 34 presents a pair of graphs of antiviral activity against T7 phage of BDCA-RNM under daylight irradiation and charged BDCA-RNM in dark condition.

Antiviral function, defined as the killing or inactivation of viruses, is another desired property for bio-protective PPE materials. To evaluate the antiviral performance of the RNMs, the membrane surface was tested with T7 bacteriophage and the viral activity was evaluated by *E. coli* based stationary-phase plating assay. T7 phage is a non-enveloped dsDNA virus that has a single proteinaceous capsid which has been shown to be less sensitive to photodynamic destruction than that of enveloped or RNA-based viruses. Therefore, T7 phage is an appropriate viral model to test the reduction of viruses by contact with the RNMs. As shown in FIG. 34, nearly no contact-killing was observed on the control samples, as the harvested phages could grow and proliferate freely on the *E. coli* based culture medium. In contrast, the BDCA-RNM showed rapid and effective killing of T7 phage, achieving 5 log of plaque forming unit (PFU) reduction after as little as 5 minutes of contact under daylight exposure. The charged BDCA-RNM also achieved 5 log of PFU reduction within 30 minutes of contact under dark conditions. This fast and highly effective biocidal activities is significantly superior to that of conventional photo-induced antiviral materials. Moreover, when compared with above bacterial-killing results, the virus has shown more susceptibility to the photoactive RNM samples. Without being bound to a particular theory, this can be because the ROS can cause crosslinking of capsid proteins in viruses, resulting in a direct impairment of the capability of the viruses to bind to host surfaces.

Example 8: Applicability of BDCA-RNM for PPE Applications

Figure 35:
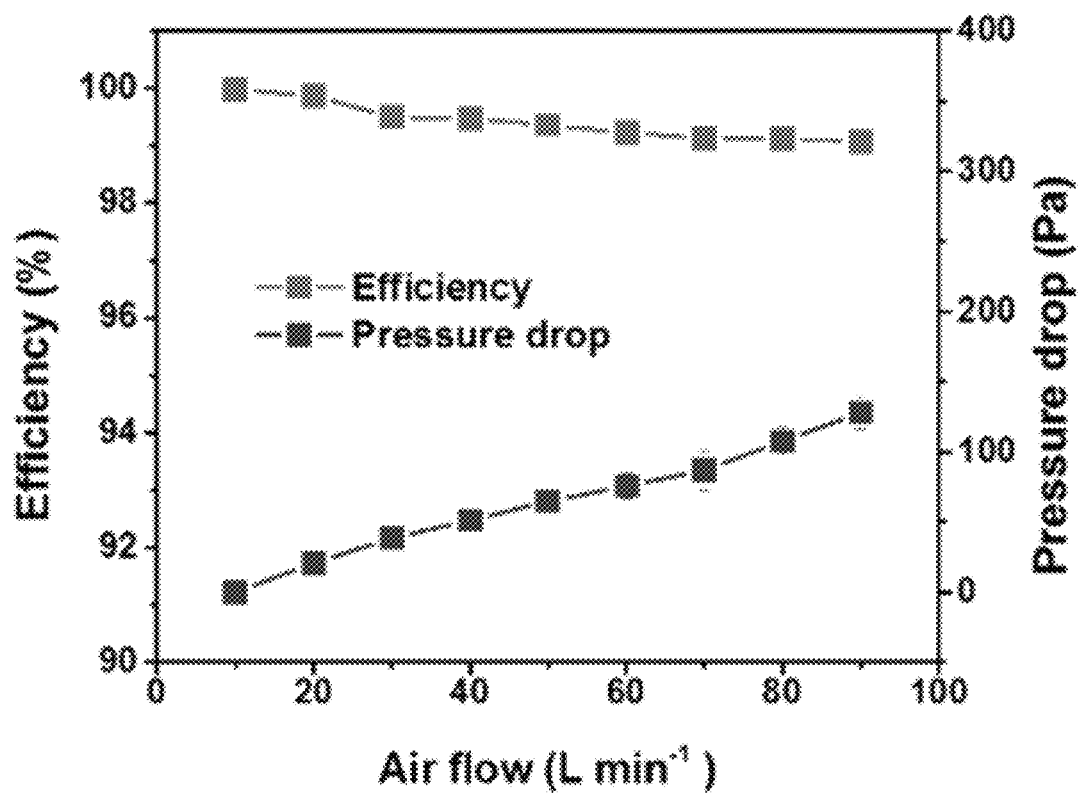
FIG. 35 is a graph of the filtration efficiency and pressure drop of BDCA-RNM as a function of airflow.
Figure 36:
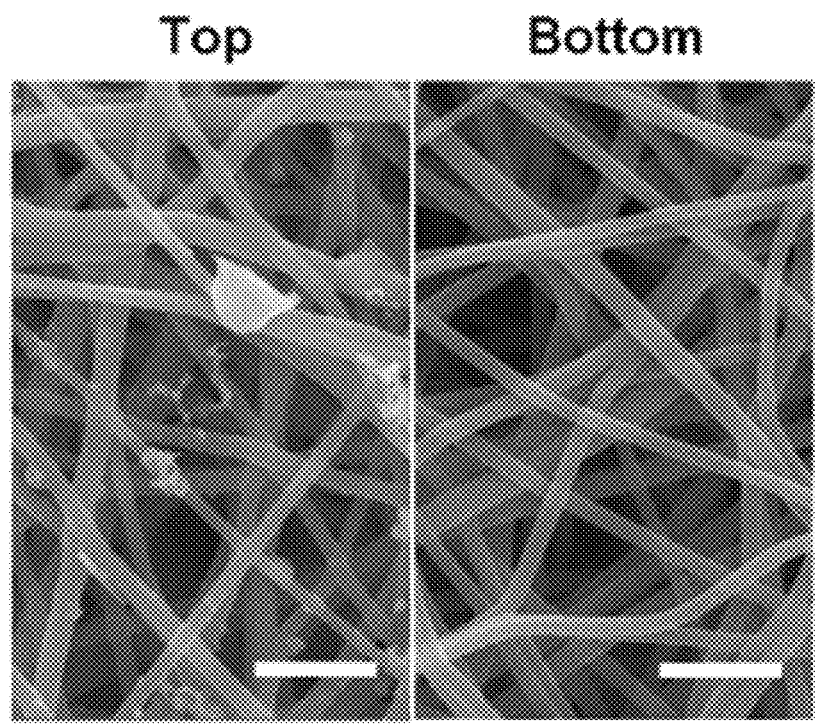
FIG. 36 presents a pair of SEM images of the top and bottom surface of BDCA-RNM after filtration (airflow of 90 L min-1, testing for 5 min).
Figures 37, 38:
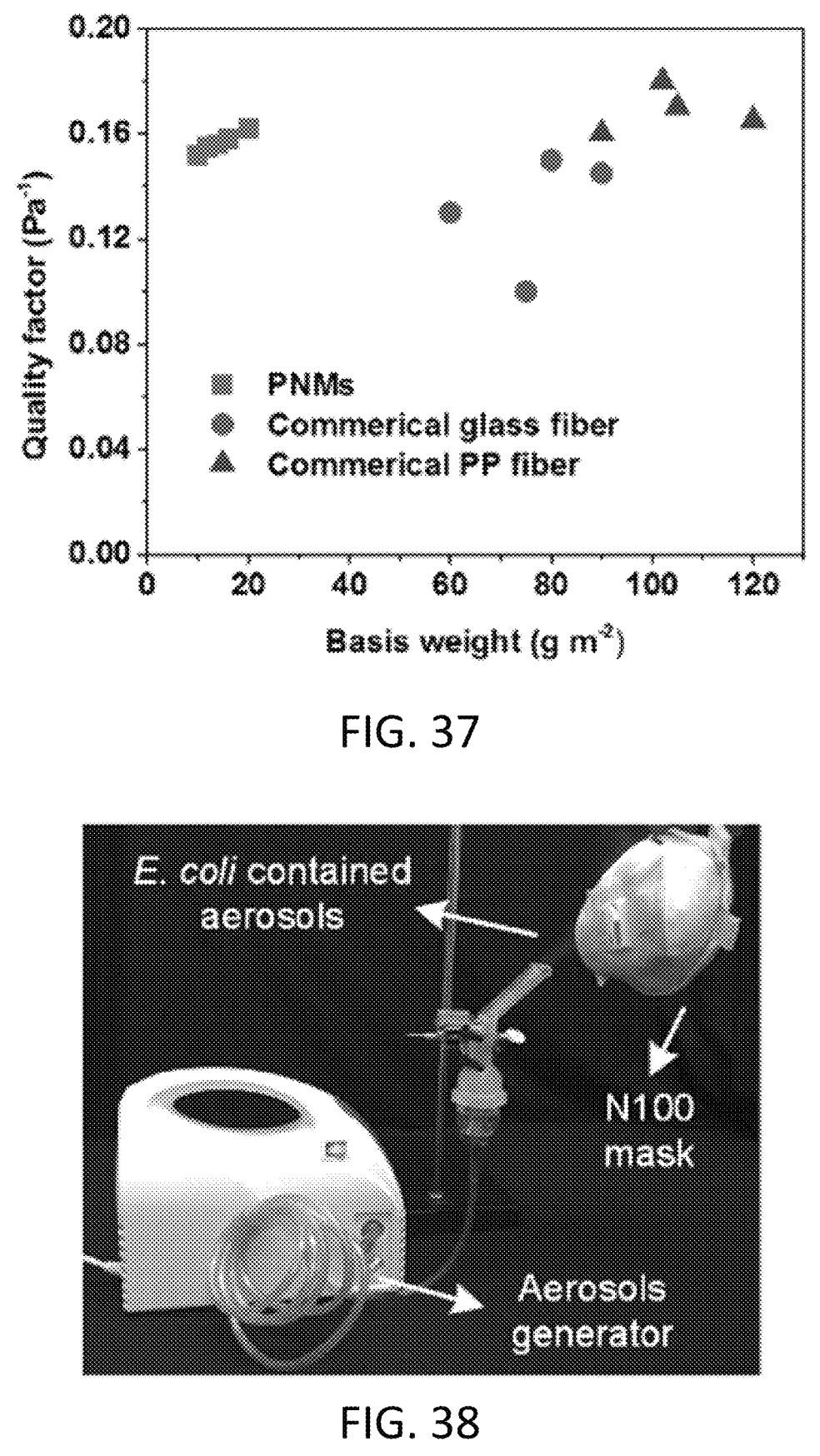

To demonstrate the applicability of BDCA-RNM as a biocidal surface function layer for bio-protection applications using current PPE materials, the interception properties of the BDCA-RNM against ultrafine particles were investigated. Filtration performance evaluations were carried out with the use of polydisperse sodium chloride (NaCl) particles with diameter of 300-500 nm under increasing airflow. As shown in FIG. 35, with increasing airflow from 10 to 90 L min$^{-1}$, the filtration efficiency of the BDCA-RNMs exhibited only a very slight decrease from 99.98% to 99.07%, which was distinctly higher than that of N95 facial masks (95%), a commonly used PPE device for HCWs. The pressure drops showed an increased trend directly proportional to the air flow, indicating a cellular dominated permeation behavior similar to that of the open-cell porous structure. Significantly, the maximum pressure drop of the BDCA-RNM was 128 Pa at 90 L min$^{-1}$, which was only one third of the pressure drop standard of N95 facemask (350 Pa at 85 L min$^{-1}$), highlighting the robust air permeability of the nanofibrous structure. The promising filtration efficiency was also confirmed by SEM observations. From FIG. 36 it can be seen that abundant particles were captured on the top surface of the BDCA-RNM, while no particles were observed on the bottom surface. Also, the membranes well maintained their structural integrity during the filtration process. To further visually evaluate the filtration capacity, the filtration quality factor (QF) of BDCA-RNM was determined with different basis weight values (FIG. 37). Strikingly, the BDCA-RNM with one-tenth of the basis weight exhibited clearly higher QF values than conventional commercialized filtration materials, indicating the promising potential of the provided materials for protective applications.

Figure 39:
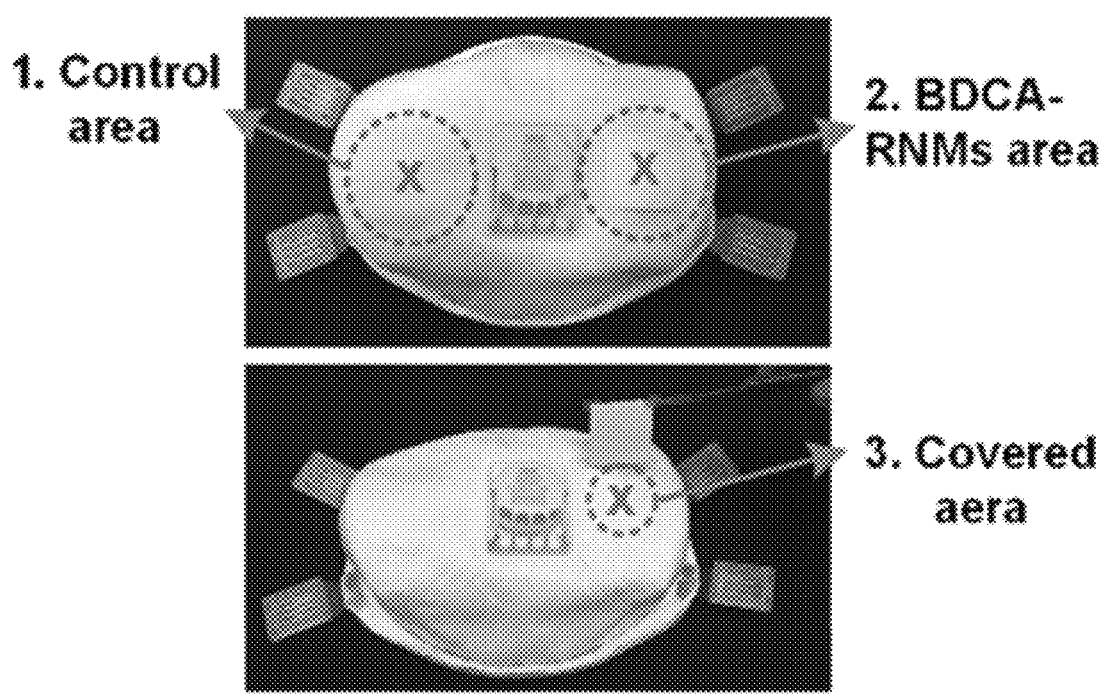
FIG. 39 is a photograph of three selected test areas on the mask of FIG. 38.
Figure 40:
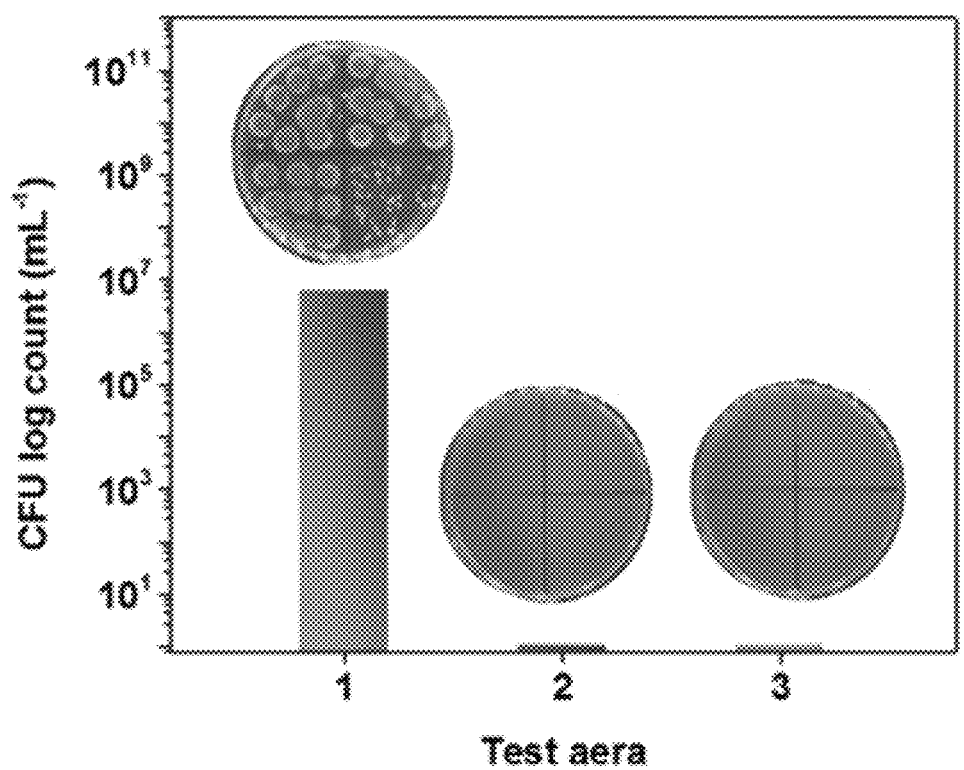
FIG. 40 is a graph of CFU log counts of E. coli from the three areas of FIG. 39.
Figure 41:
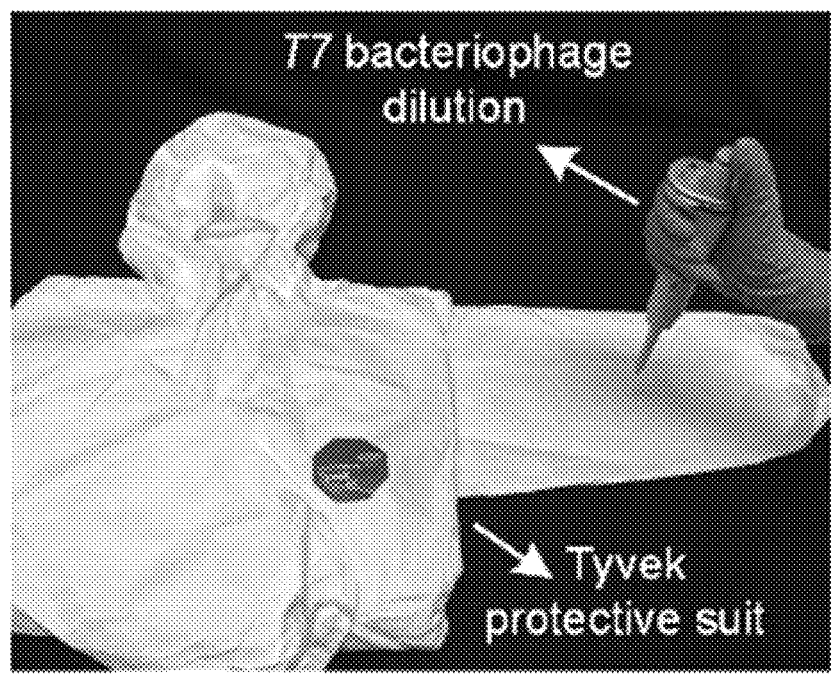
FIG. 41 is a photograph of a protective suit loaded with T7 phage in a test.
Figure 42:
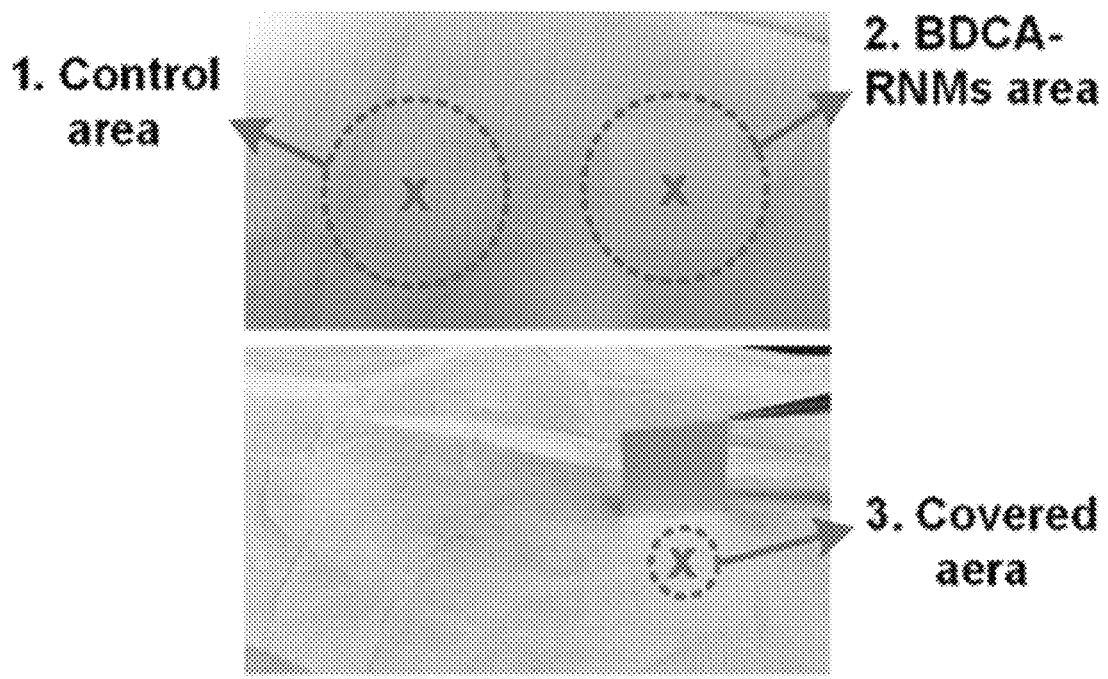
FIG. 42 a photograph of three selected test areas on the protective suit of FIG. 41.
Figure 43:
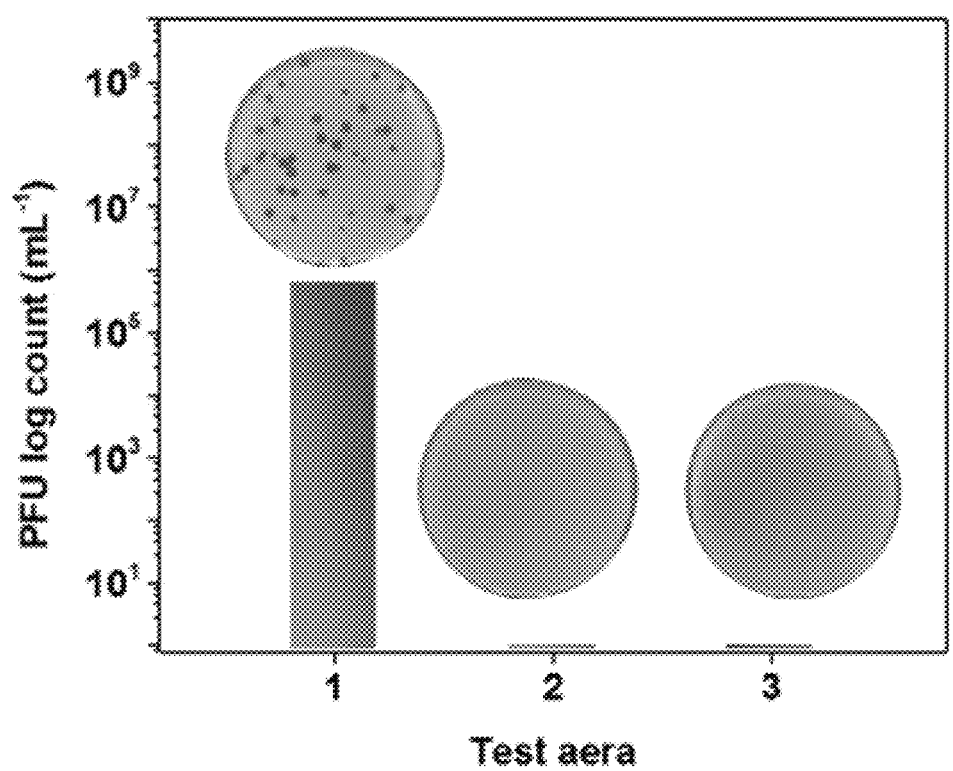
FIG. 43 is a graph of PFU log counts of T7 phage from the three areas of FIG. 42.

As a proof-of-concept for bio-protective PPE application, the charged BDCA-RNM (1 hour of daylight irradiation) was attached to a conventional respirator and protective suit. As shown in FIG. 38, an aerosol having a diameter of 0.5-5 µm and containing 1×10$^6$ CFU of *E. coli* was sprayed onto the surface of a 3M N100 respirator. The aerosol served as a model infection aerosol similar in size to aerosols generated by human sneezing or coughing. A charged BDCA-RNM with a size of 2×2 cm$^2$ was stuck on the right side of the respirator, and the respirator was exposed to a 0.2 mL min$^1$ of aerosols flow for 30 seconds. After standing for 30 min, the population of the living bacteria on three representative areas (i.e., a control area, a BDCA-RNM area, and a covered area) were harvested and measured (FIG. 39). As shown in FIG. 40, the *E. coli* loaded on the control area exhibited high activity with free growth and proliferation, which was due to the lack of biological function of the traditional nonwoven materials. In contrast, no live bacteria were detected on the BDCA-RNM area or the covered area, indicating robust protection against the pathogens. Similarly, the charged BDCA can also bring about promising bio-protection against the model virus to the typical protective suit, as demonstrated in FIGS. 41-43. These results indicate that the BDCA-RNM could serve as a scalable biocidal layer that not only intercept but also effectively kill pathogens either in aerosols or liquid source, implying its potential broad applications in bio-protective PPE against the increasing EID threats.

Example 9: Materials and Methods for Examples

Poly(vinyl alcohol-co-ethylene) (PVA-co-PE, ethylene content of 27 mol %), 4-benzoylbenzoic acid, 3,3',4,4'-benzophenone tetracarboxylic dianhydride (BPTCD), tetrahydrofuran (THF), dioxane, acetone, chloroform, isopropanol, polyphosphoric acid (PPA), 25 wt % glutaraldehyde solution, 37% formaldehyde solution, and 4 wt % osmium tetroxide (OsO4), potassium iodide, sodium hydroxide, ammonium molybdate tetrahydrate, potassium hydrogen phthalate, propidium iodide (PI), and Sybr green (SG) dye were purchased from Sigma-Aldrich (Milwaukee, WI, USA). p-nitrosodimethylaniline (p-NDA), chlorogenic acid, Luria-Bertani (LB) broth, LB agar, Tryptic soy broth (TSB), and Tryptic soy agar (TSA) were purchased from Fisher Scientific (Hampton, NH, USA). Phosphate buffer saline (PBS) and Tris-buffered saline (TBS) were obtained from USB Co. Ltd. (Cleveland, OH, USA).

The electrospinning solution was prepared by dissolving PVA-co-PE ($M_n$=90,000, Sigma-Aldrich) in a mixture of isopropanol and water (weight ratio of 7:3) at 80° C. with stirring for 6 h, the concentrations of PVA-co-PE was 7 wt %. Afterward, the solution was transferred to a 20 mL syringe capped with a 6-G needle and fed with a controllable rate of 2 mL h$^{-1}$ using a programmable syringe pump (Kent Scientific). A high voltage of 30 kV (EQ30, Matsusada Inc.) was applied to the needle tip, resulting in a generation of a continuous jetting stream. The resulting PVA-co-PE nanofibrous membranes were deposited on a wax-paper covered metallic roller at a 20 cm tip-to-collector distance, and then dried in vacuum at 50° C. for 2 h to remove any residual solvent. $^1$H NMR (400 MHz, DMSO-d$_6$): δ (ppm)=1.27 (d, 4H), 3.01-4.79 (m, 1H)

In the case of BA-RNM, 0.2 g of 4-benzoylbenzoic acid and 5 g of CDI were dissolved in 20 mL of THF, then 0.1 g of PVA-co-PE nanofibrous membranes were immersed into the as-prepared solution with stirring at 60° C. After 2 h of reaction, the resulted membranes were washed with acetone and dried in vacuum. $^1$H NMR (400 MHz, DMSO-d$_6$): δ (ppm)=1.27 (d, 4H), 2.92-5.01 (m, 1H), 7.03-8.48 (m, 9H).

In the case of CA-RNM, 0.2 g of chlorogenic acid and 5 g of CDI were dissolved in 20 mL of THF, then 0.1 g of PVA-co-PE nanofibrous membranes were immersed into the as-prepared solution with stirring at 60° C. After 2 h of reaction, the resulted membranes were washed with acetone and dried in vacuum. $^1$H NMR (400 MHz, DMSO-d$_6$): δ (ppm)=1.27 (d, 4H), 1.64-1.88 (m, 2H), 1.88-2.10 (m, 2H) 3.16-4.78 (m, 4H), 5.21 (d, 1H), 6.15 (d, 1H), 6.63-7.51 (m, 3H).

In the case of BD-RNM, 0.2 g of BPTCD and 0.2 g of PPA were dissolved in 20 mL of dioxane, then 0.1 g of PVA-co-PE nanofibrous membranes were immersed into the as-prepared solution with stirring at 80° C. After 2 h of reaction, the resulted membranes were washed with acetone and dried in vacuum. $^1$H NMR (400 MHz, DMSO-d$_6$): δ (ppm)=1.27 (d, 4H), 2.88-4.79 (m, 1H), 7.73-8.32 (m, 6H).

In the case of BDCA-RNM, 0.2 g of chlorogenic acid and 0.2 g of PPA were dissolved in 20 mL of dioxane, then 0.1 g of above BD-RNM was immersed into the as-prepared solution with stirring at 80° C. After 2 h of reaction, the resulted membranes were washed with acetone and dried in vacuum. $^1$H NMR (400 MHz, DMSO-d$_6$): δ (ppm)=1.27 (d, 4H), 1.64-1.84 (m, 2H), 1.86-2.15 (m, 2H), 2.88-4.82 (m, 4H), 5.21 (d, 1H), 6.15 (d, 1H), 6.59-8.50 (m, 9H).

A daylight irradiation device (Spectrolinker XL-1500, Spectronics Corporation, NY, USA) equipped with a D65 standard light source (GE F15T8/D) was used in our experiment. The output power was set to be an irradiance of 6.5 mW cm$^{-2}$ at a distance of 16 cm from the lamp. The generation of ROS was measured in terms of the amounts of OH· and $H_2O_2$. The yield of OH· was quantified by the bleaching of p-NDA, which was a selective scavenger for quenching hydroxyl radicals. In a typical experiment, 10 mg of the sample membranes were immersed into 10 mL of p-NDA (50 μmol L$^{-1}$), which was exposed under daylight or dark conditions for a certain time. The amount of p-NDA left in the solution was measured quantitatively with the absorbance at $\lambda_{max}$ with 440 nm. Similarly, the amount of $H_2O_2$ was quantified with an indirect spectrophotometric method. In a typical test, 10 mg of the sample membranes were placed in 10 mL of deionized water, which was exposed under daylight or dark conditions for a certain time. After the exposure, 1 mL of sample solution was mixed with 1 mL of a reagent I (aqueous solution of potassium iodide, 66 g L$^{-1}$, sodium hydroxide, 2 g L$^{-1}$, and ammonium molybdate tetrahydrate, 0.2 g L$^{-1}$) and 1 mL of a reagent II (aqueous solution of potassium hydrogen phthalate, 20 g L$^{-1}$) with stirring for 5 min. The concentration of formed $H_2O_2$ in the solution was measured quantitatively with the absorbance at $\lambda_{max}$ with 351 nm.

Bactericidal experiments were performed on the typical etiological bacteria, gram-negative *E. coli* O157:H7 (ATCC 700728, Manassas VA, USA) and gram-positive *L. innocua* (ATCC 33090, Manassas, VA, USA). 10 mL of LB broth was inoculated with a colony of *E. coli* 0157 and grown at 37° C. at 150 rpm. A bacterial culture with an absorbance at 600 nm of 0.4 (2×10$^8$ CFU mL$^{-1}$ assessed by plate counting) was used for the further experiments. Similarly, a colony of *L. innocua* was grown in 10 mL of TSA broth at 30° C. at 150 rpm until it reached an absorbance at 600 nm of 1.5 (1×10$^9$ CFU mL$^{-1}$ assessed by plate count) and used for the following experiments.

T7 bacteriophage (ATCC, BAA-1025-B2, Manassas, VA, USA) was cultured in *E. coli* BL21 cells (ATCC #BAA-1025) in 10 mL of LB medium, and allowed to incubate at 37° C. with a shaking speed of 250 rpm. After 4 h incubation, 2.5 ml of chloroform was added to the solution, and allowed to incubate at 37° C. for 20 min with moderate shaking to lyse any remaining bacteria. Then the culture was centrifuged for 10 min at 5800 rpm to remove bacterial debris. The supernatant containing the phages was decanted and chilled on ice overnight at 4° C. prior to centrifugation at 11,000 rpm for 15 min. The pellet was suspended in sterile water and diluted in PBS until a titer of 1.0×10$^7$ plaque-forming units (PFU) per milliliter was obtained (confirmed by plaque count plating).

In a typical experiment, 10 μL of the bacterial (*E. coli* or *L. innocua*) suspension were spotted on the surface of control samples (PVA-co-PE) or RNM samples in a size of 2×2 cm$^2$, then the samples were exposed to daylight or dark conditions for a certain time. At each time point, the samples with the bacteria were vortexed in a tube containing 1 mL of DI water, and the suspension was serially diluted (×10$^1$, ×10$^2$, ×10$^4$, and ×10$^6$) to be plated on LB agar (*E. coli*) or TSA agar (*L. innocua*) for the bacterial enumeration. For the cyclic antimicrobial assays, after each test the samples were sonicated for 5 min to remove the attached bacterial debris.

The bacteria loaded on the control or RNM samples were harvested by vortexing the samples in a tube containing 500 μL of DI water, and washed 3 times with PBS. In the case of fluorescence microscope imaging, the bacterial suspension was added with 5 μg mL$^{-1}$ of PI and SG fluorescence) DNA dye (10,000 times dilution, and incubated in dark for 20 min at room temperature. Then, 10 μL of the suspension was spotted on a microscope slide and visualized using a laser scanning confocal microscope (Olympus FV1000). In the case of SEM imaging, the bacterial suspension was fixed in PBS solution containing 2 wt % of formaldehyde and 1 wt % of glutaraldehyde for 1 h, then the bacteria were rinsed with DI water three times followed by soaking in 1% OsO4 solution for 30 min. Bacterial samples were then dehydrated by a sequential 10 min immersion/removal of ethanol/water mixtures with an increasing ethanol content of 25, 50, 75, 90, and 100%, respectively. Finally, the bacterial samples were placed on copper tape and coated with palladium prior to SEM analysis.

In a typical experiment, 10 μL of the phage dilution were spotted on the surface of control or RNM samples in a size of 2×2 cm$^2$; then the samples were exposed to daylight or dark conditions for a certain time. At each time point, the samples with the phages were vortexed in a tube containing 2 mL of Tris-buffered saline. After serial dilution, 0.1 mL of phage solution was mixed with 0.25 mL of stationary-phase host *E. coli* BL21 (approximately A600 nm=1.5 OD), followed by incubation for 10 min at 37° C. Afterwards, 3 mL of molten LB agar at 45° C. was added and mixed with the incubated bacteria plus phages and immediately poured onto a pre-warmed LB agar plate and allowed to solidify. Once the plate solidified, all the plates were inverted and incubated at room temperature overnight, and then the plaques were counted. Phage was counted and reported as PFU mL$^{-1}$.

All calculations were performed using computational chemistry software package Gaussian 09 ver. 08. Initial geometries at ground state were optimized at computed at unrestricted DFT-B3LYP/6-31+G(d,p) level of theory in CPCM-$H_2O$ solvent. Using these geometries, the nature of singlet and triplet excited states and transition energies calculations were performed using the TDDFT-B3LYP/6-31+G(d,p) level of theory in CPCM-$H_2O$ solvent. The Gibbs free energies of all compounds were obtained by frequency calculations at unrestricted DFT-B3LYP/6-311+G(d,p) level of theory in CPCM-$H_2O$ solvent using geometries optimized at unrestricted DFT-B3LYP/6-31+G(d,p) level of theory in CPCM-H$_2$O solvent. The electrostatic potential (ESP) calculation was performed by single point energy calculations with CHELPG5 ESP population analysis at unrestricted DFT-B3LYP/6-31+G(d,p) level of theory in CPCM-H$_2$O solvent. Total electron density was first plotted and then were mapped with ESP derived charges to show a distribution of charges on the molecular structure.

Field emission scanning electron microscopy (FE-SEM) images were examined by a Philips FEI XL30. UV-vis absorption spectra were collected with an Evolution 600 spectrophotometer (Thermo Scientific, USA), the diffuse reflection spectra were collected with a DRA-EV-600 diffuse reflectance accessory (Labsphere, USA). $^1$H NMR spectra were recorded on a 400 MHz Bruker Avance HD spectrometer and d$_6$-DMSO was used as a solvent. A TSI Model 8130 automated filter tester (TSI, Inc., MN, USA) was used to measure the filtration efficiency and pressure drop, NaCl monodisperse aerosols with a size of 0.3-0.5 m and a standard deviation less than 1.86 were used as the model particles.

Example 10: Applicability of RNM for Food Protection

Vitamin K3 (VK3) was physically blended with poly vinyl alcohol-co-poly ethylene (PVA-co-PE), a commonly used food packaging material, and fabricated into photoactive nanofibrous membrane via electrospinning technique.

The electrospinning solution was prepared by dissolving PVA-co-PE (Mn=90,000; Sigma-Aldrich) polymer particles in a mixture of water and isopropanol (weight ratio of 3:7) at 85° C. with stirring for 4 hours; the concentration of PVA-co-PE was 8 wt %. Then VK3 (10 wt % of PVA-co-PE) was added to this solution and mixed well. Afterward, the solution was transferred to a 20-ml syringe capped with needle (1.27 mm×2.5 cm). A syringe pump (New Era Pump Systems, Inc.) was used to feed the solution with a rate of 2 ml hour$^{-1}$. A high voltage of 28 kV (DW-03, E-star Group Technology Co., Ltd) was applied to the needle generating a continuous charged polymer jet. After evaporation of the solvent and solidification of the polymer fiber, VK3/PVA-co-PE nanofibrous membranes were deposited on a wax paper-covered roller at a 15-cm tip-to-collector distance and then dried in vacuum at 40° C. for 1 hour to remove any residual solvent.

Figure 44:
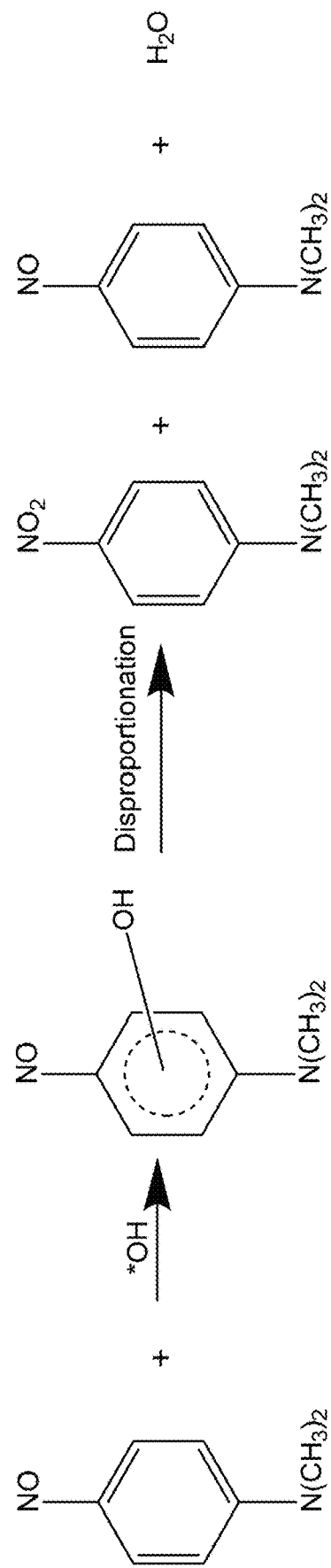
FIG. 44 is a possible mechanism of reaction between p-NDA and hydroxy radical.

To evaluate photoactivity of the prepared photoactive nanofibrous membrane, N,N-Dimethyl-4-nitrosoaniline (p-NDA), a hydroxyl radical scavenger, was used to test the hydroxyl radical (OH·, one type of ROS) produced during photoreduction process as discussed in Kraljić, I., & Trumbore, C. N. (1965). p-Nitrosodimethylaniline as an OH Radical Scavenger in Radiation Chemistry 1. Journal of the American Chemical Society, 87(12), 2547-2550. The mechanism of p-NDA to scavenge hydroxyl radical is depicted in FIG. 44. As shown by this equation, 2 OH· consume 1 p-NDA accompanied by the formation of nitrobenzene and water; thus, the OH· generation efficiency of the prepared nanofibrous membrane can be determined.

Figure 45:
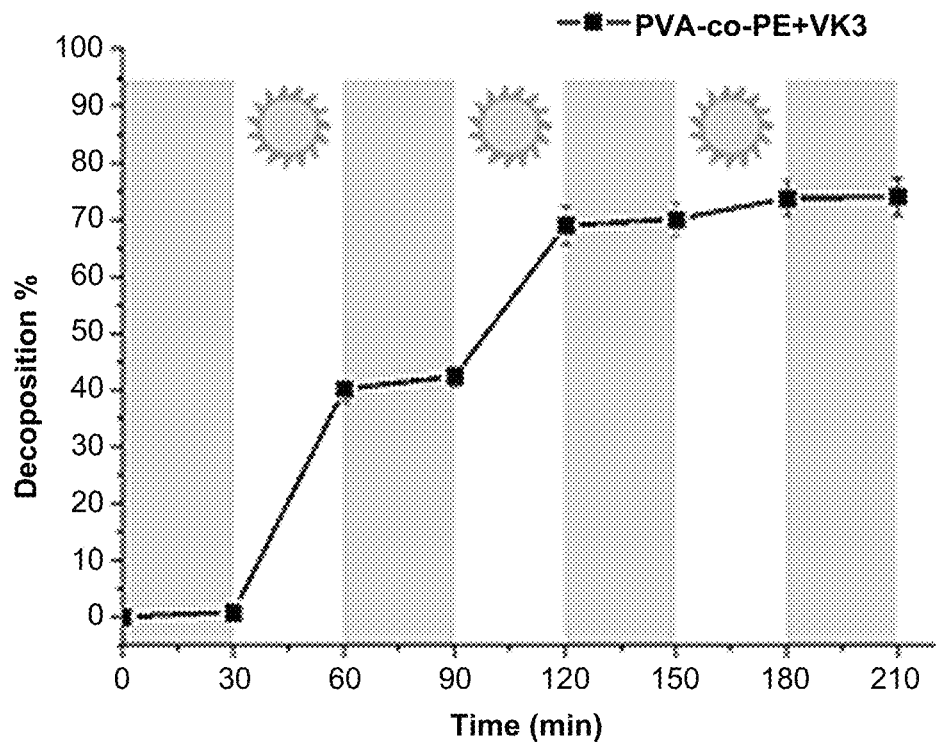
FIG. 45 presents the generation of hydroxyl radicals produced by 10 mg of vitamin K3 (VK3)/poly(vinyl alcohol-co-ethylene) (PVA-co-PE) nanofibrous membrane under ultraviolet irradiation/dark alternation.

10 mg of the prepared membrane was placed into 10 mL of the 5×10$^{-5}$ mol-L$^{-1}$ p-NDA solution and was subjected to a UVA-irradiation/dark recycle with 30-min interval alternation test. The distance between the light source and sample was 16 cm. The light intensity in the crosslinker was 6.5 mW/cm$^2$. The amount of p-NDA left in the solution was measured quantitatively according to the standard curve after each 30 min test duration. The p-NDA consumption was transferred to hydroxyl radical production according to stoichiometry ratio mentioned above. Then the production of hydroxyl radicals was plot in graph as a function of irradiation or dark duration time. The p-NDA decomposition result is depicted in FIG. 45.

Figure 46:
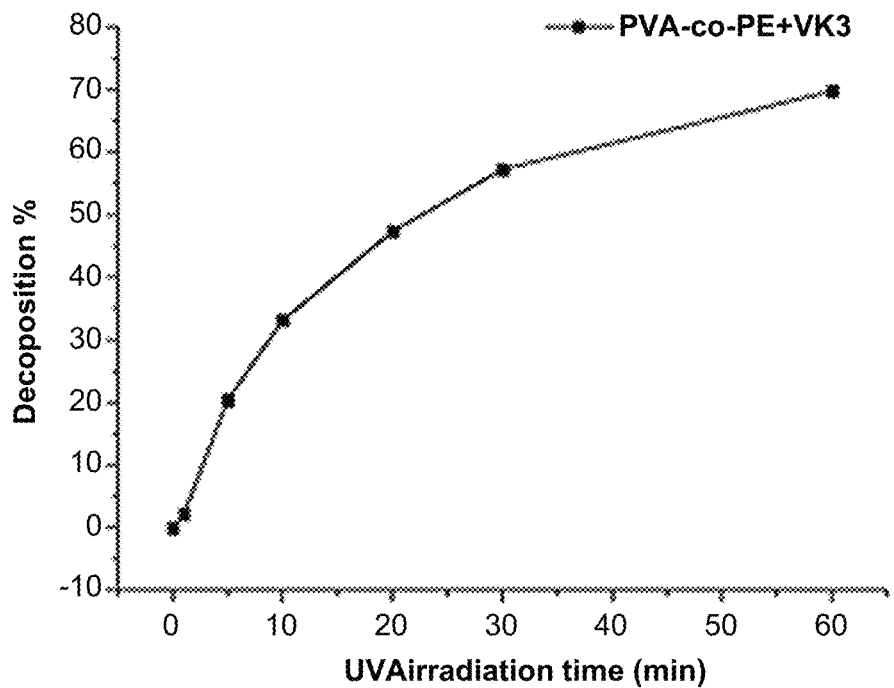
FIG. 46 presents the generation of hydroxyl radicals produced by 10 mg of VK3/PVA-co-PE nanofibrous membrane under UVA irradiation.

Based on the result, the generation of OH· was mainly observed during UVA irradiation and paused during dark periods, which proves that ROS generation activity of the prepared VK3/PVA-co-PE nanofibrous membrane is triggered by light irradiation. To evaluate the OH· generation ability of the prepared nanofibrous membrane, 10 mg of the prepared membrane was placed into 10 mL of the 5×10$^{-5}$ mol-L$^{-1}$ p-NDA solution and placed under a UVA-irradiation for different time duration, the OH· generation efficiency of the prepared membrane can be obtained. The result is shown in FIG. 46.

The prepared VK3/PVA-co-PE nanofibrous membrane exhibited high OH· generation capacity of 1190 μg g$^{-1}$ h$^{-1}$, which was several times higher than those of other light-driven photoactive materials, which shows the robust photoactivity of the prepared nanofibrous membrane and reveals its potential in antimicrobial related applications. See Zhuo, J. (2016). Antimicrobial textiles. Woodhead Publishing.

Although the foregoing invention has been described in some detail by way of illustration and example for purposes of clarity of understanding, one of skill in the art will appreciate that certain changes and modifications may be practiced within the scope of the appended claims. In addition, each reference provided herein is incorporated by reference in its entirety to the same extent as if each reference was individually incorporated by reference. Where a conflict exists between the instant application and a reference provided herein, the instant application shall dominate.

What is claimed is:

1. A photobiocidal polymer comprising:
a foundation polymer; and
a photosensitizer or photosensitizer moiety; wherein the photosensitizer or photosensitizer moiety is selected from the group consisting of

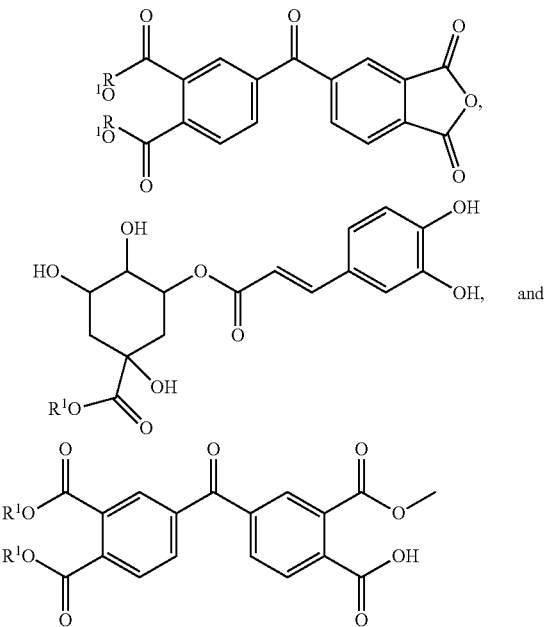

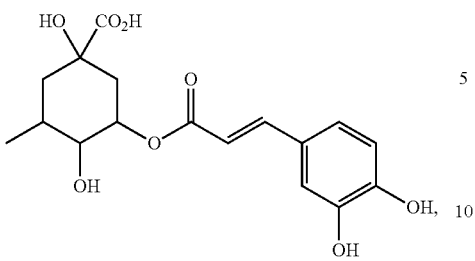

wherein each $R^1$ is independently selected from the group consisting of hydrogen, $C_{1-12}$ alkyl, and a bond to the foundation polymer.

2. The photobiocidal polymer of claim 1, wherein the photosensitizer is mixed with the foundation polymer.

3. The photobiocidal polymer of claim 1, wherein the photosensitizer moiety is linked to the foundation polymer.

4. The photobiocidal polymer of claim 1, wherein the photosensitizer or photosensitizer moiety is selected from the group consisting of

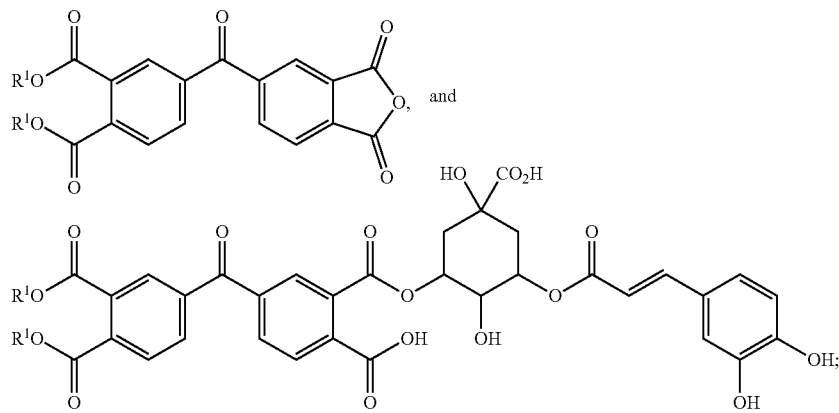

wherein each $R^1$ is independently selected from the group consisting of hydrogen, $C_{1-12}$ alkyl, and a bond to the foundation polymer.

5. A photobiocidal fiber comprising the photobiocidal polymer of claim 1.

6. The photobiocidal fiber of claim 5, wherein the fiber is a nanofiber.

7. The photobiocidal fiber of claim 5, wherein the fiber is a microfiber.

8. A porous membrane comprising the photobiocidal fiber of claim 5.

9. The porous membrane of claim 8, wherein the porous membrane has an average fiber diameter ranging from about 100 nm to 500 nm.

10. The porous membrane of claim 9, wherein the porous membrane has an average fiber diameter ranging from about 200 nm to 250 nm.

11. The porous membrane of claim 8, wherein the porous membrane has a thickness ranging from about 1 μm to 500 μm.

12. The porous membrane of claim 8, wherein the porous membrane comprises poly(vinyl alcohol-co-ethylene).

13. The porous membrane of claim 8, wherein the porous membrane comprises a biopolymer.

14. The porous membrane of claim 8, wherein the biopolymer is cellulose, alginate, chitosan, or a protein.

15. A biocidal material comprising the porous membrane of claim 8.

16. The biocidal material of claim 15, wherein the photosensitizer moiety is

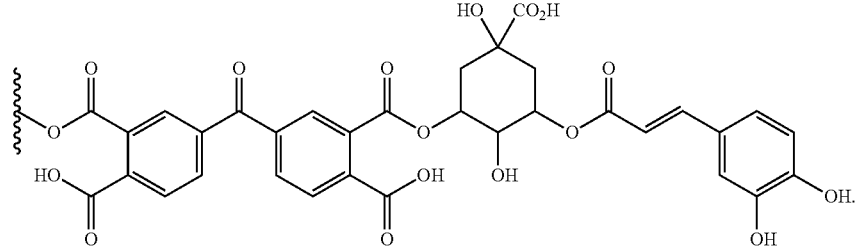 [SMILES: *OC(=O)c1cc(C(=O)c2ccc(C(=O)O)c(C(=O)OC3CC(O)(C(=O)O)CC(OC(=O)/C=C/c4ccc(O)c(O)c4)C3O)c2)ccc1C(=O)O]

17. The biocidal material of claim 15, wherein the biocidal material is included in a wearable article or an article for food packaging.

18. The biocidal material of claim 15, wherein the biocidal material is attached to a surface of personal protective equipment.

19. The biocidal material of claim 15, wherein the biocidal material is included in a film or layer of a coating material.

* * * * *